United States Patent
Van Esbroeck et al.

(10) Patent No.: US 10,455,842 B2
(45) Date of Patent: Oct. 29, 2019

(54) SYSTEM AND METHOD FOR MEASURING A SHOULDER JOINT POSITION OF A CARCASS PART OF SLAUGHTERED POULTRY

(71) Applicant: MAREL STORK POULTRY PROCESSING B.V., Boxmeer (NL)

(72) Inventors: Maurice Eduardus Theodorus Van Esbroeck, Bemmel (NL); Johannis Anthonie Vroegop, Nijmegen (NL); Roger Pierre Hubertus Maria Claessens, Nijmegen (NL); Guido Johannes Antonius Kusters, Boxmeer (NL)

(73) Assignee: MAREL STORK POULTRY PROCESSING B.V., Boxmeer (NL)

( * ) Notice: Subject to any disclaimer, the term of this patent is extended or adjusted under 35 U.S.C. 154(b) by 0 days.

(21) Appl. No.: 16/093,445

(22) PCT Filed: Apr. 25, 2017

(86) PCT No.: PCT/NL2017/050265
§ 371 (c)(1),
(2) Date: Oct. 12, 2018

(87) PCT Pub. No.: WO2017/188812
PCT Pub. Date: Nov. 2, 2017

(65) Prior Publication Data
US 2019/0116811 A1    Apr. 25, 2019

(30) Foreign Application Priority Data
Apr. 29, 2016  (NL) ...................................... 2016700

(51) Int. Cl.
A22B 5/00   (2006.01)
A22C 21/00  (2006.01)
A22B 7/00   (2006.01)

(52) U.S. Cl.
CPC ............ *A22B 5/0064* (2013.01); *A22B 7/003* (2013.01); *A22C 21/0023* (2013.01); *A22C 21/0053* (2013.01)

(58) Field of Classification Search
CPC ................................ A22B 5/0064; A22B 7/03
See application file for complete search history.

(56) References Cited

U.S. PATENT DOCUMENTS

| | | | | |
|---|---|---|---|---|
| 6,974,373 B2 * | 12/2005 | Kriesel | ................ | A01K 11/008 452/157 |
| 7,399,220 B2 * | 7/2008 | Kriesel | ................ | A01K 11/008 452/157 |

(Continued)

FOREIGN PATENT DOCUMENTS

| | | |
|---|---|---|
| EP | 0 931 459 A1 | 7/1999 |
| JP | 2011-177096 A | 9/2011 |
| WO | WO 2016/002630 A1 | 7/1999 |

OTHER PUBLICATIONS

Dutch Search Report, issued in Priority Application No. 2016700, dated Jan. 12, 2017.

(Continued)

*Primary Examiner* — Richard T Price, Jr.
(74) *Attorney, Agent, or Firm* — Birch, Stewart, Kolasch & Birch, LLP

(57) ABSTRACT

A system and method for measuring a shoulder joint position of a carcass part of slaughtered poultry are disclosed. The system includes a position measurement device, having a mechanical contact member which is adapted to engage at least one shoulder joint during a measurement of the shoulder joint position, and a product carrier which is adapted to (Continued)

support the carcass part during movement of the product carrier along the conveying path past the position measurement device. The position of the product carrier during the measurement of the shoulder joint position is such that the carcass part is arranged relative to the position measurement device with the left shoulder joint and right shoulder joint one behind the other as seen in the transport direction so as to allow the mechanical contact member to engage a shoulder joint bone structure of a shoulder joint.

20 Claims, 10 Drawing Sheets

(56) References Cited

U.S. PATENT DOCUMENTS

| | | | |
|---|---|---|---|
| 7,473,166 B2* | 1/2009 | Sbarro | A22C 17/0006 452/135 |
| 8,992,290 B2* | 3/2015 | Taniguchi | A22C 17/004 452/135 |
| 9,033,774 B2* | 5/2015 | Taniguchi | A22C 17/004 452/136 |
| 2017/0119002 A1 | 5/2017 | Inoue et al. | |

OTHER PUBLICATIONS

International Search Report, issued in PCT/NL2017/050265, dated Jul. 20, 2017.
Written Opinion of the International Searching Authority, issued in PCT/NL2017/050265, dated Jul. 20, 2017.

* cited by examiner

SYSTEM AND METHOD FOR MEASURING A SHOULDER JOINT POSITION OF A CARCASS PART OF SLAUGHTERED POULTRY

The invention pertains to a system and method for a shoulder joint position of a carcass part of slaughtered poultry.

The shoulder joint is the joint which in living poultry connects the wings to the body of the poultry. The shoulder joint position is a good indication of the overall size of the carcass part.

WO2016/02630 discloses a system for measuring the contour of a carcass part of slaughtered poultry. The known system comprises two sensor members, which are moved over the poultry carcass over the back, shoulder and front of the carcass part. One sensor member moves over the left shoulder and the other sensor member is moved over the right shoulder. The measurements of these sensor members are combined with information about the movement of the product carrier that supports the carcass part in order to determine the contour of the carcass part.

The accuracy of the known system is affected by the presence of soft tissue such as fat and/or skin adjacent to the shoulder joints and in the neck region as well as the presence of breast meat in this region.

The soft tissue is flexible and generally loosely connected to the carcass part. It is mainly present on the front side and the back side of the carcass part, much less on the sides. In the system as disclosed in WO2016/02630, soft tissue can be pushed or dragged along by the sensor members and may end up between the carcass part and the shoulder joints. This affects the accuracy of the contour measurement.

Some carcass parts, in particular large carcass parts, contain quite a large volume of breast meat in the vicinity of the shoulder joints. The breast meat may even extend above or past the shoulder joints. This may hinder the correct interpretation of the determined contour. In addition, the meat is flexible and may be pushed over a shoulder joint by the sensor member, which leads to an inaccurate determination of the contour.

The invention aims to provide an improved system and method for measuring a shoulder joint position of a carcass part of slaughtered poultry.

According to the invention, this object is achieved with a system for measuring a shoulder joint position of a carcass part of slaughtered poultry,
wherein the carcass part comprises a left shoulder joint, a right shoulder joint, soft tissue adjacent the left and/or right shoulder joints and at least a part of the breast meat adjacent the left and/or right shoulder joints, wherein the left shoulder joint and the right shoulder joint each contain a shoulder joint bone structure,
which system comprises:
  a position measurement device, which position measurement device comprises a mechanical contact member which is adapted to engage at least one of the left and right shoulder joint during a measurement of the shoulder joint position,
  a product carrier which is moveable in a transport direction along a conveying path, which conveying path extends along the position measurement device, which product carrier is adapted to support the carcass part during the movement of the product carrier along the conveying path past the position measurement device during the measurement of the shoulder joint position, characterized in that the position of the product carrier during the engagement of the mechanical contact member with the shoulder joint is such that the carcass part is arranged relative to the position measurement device with the left shoulder joint and right shoulder joint one behind the other as seen in the transport direction so as to allow the mechanical contact member to engage a shoulder joint bone structure of at least one of the left and right shoulder joint.

The system according to the invention is suitable for measuring the shoulder joint position of a carcass part which comprises a left shoulder joint, a right shoulder joint, soft tissue adjacent the left and/or right shoulder joints and at least a part of the breast meat adjacent the left and/or right shoulder joints. The left shoulder joint and the right shoulder joint each contain a shoulder joint bone structure. The shoulder joint bone structure is formed by the bones that form part of the shoulder joint. The shoulder joint bone structure has a free end that faces outward from the body of the carcass part.

Examples of such carcass parts are breast caps and front halves. The measurement of the shoulder joint position may for example include the determination of the distance between a reference, e.g. a reference point or reference line, e.g. the center or a carrier rotation axis of a product carrier, to the free end of at least one shoulder joint bone structure.

Preferably, the neck has been removed from the carcass part prior to measuring the shoulder joint position with the system according to the invention. Alternatively, the neck may be still present, but preferably it is partly cut loose and/or moved away from the area of the carcass part between the shoulder joints, for example by arranging it inside the body cavity of the carcass part or on the back of the carcass part, or by pushing the shoulder joints forward (i.e. towards the breast side of the carcass part) relative to the neck.

The system according to the invention comprises a position measurement device. The position measurement device comprises a mechanical contact member which is adapted to engage at least one of the left and right shoulder joint during the measurement of the shoulder joint position. Optionally, it is adapted to engage at least the shoulder joint which is located the furthest away from the tip of the carcass part.

The system according to the invention further comprises a product carrier. The product carrier is moveable in a transport direction along a conveying path. In addition, the product carrier is adapted to support the carcass part during movement along the conveying path past the position measurement device during the measurement of the shoulder joint position. Optionally, the system according to the invention comprises multiple product carriers, which form part of a conveyor system.

The system according to the invention is characterized in that the position of the product carrier during the engagement of the mechanical contact member with the shoulder joint is such that the carcass part is arranged relative to the position measurement device with the left shoulder joint and right shoulder joint one behind the other as seen in the transport direction. This allows the mechanical contact member to engage a shoulder joint bone structure of at least one of the left and right shoulder joint, for example the shoulder joint bone structure of the shoulder joint that is located the furthest from the center or other reference point of the product carrier.

The measurement of the position of the shoulder joint takes place when the mechanical contact member engages the shoulder joint bone structure. The measurement of the position can take place during the entire time period during which the mechanical contact member engages one or both shoulder joint bone structures or during a part of that time period. The position of the carcass part, during the measurement and/or during the time that the mechanical contact member engages at least one of the shoulder joint bone structures, may be such that left shoulder joint is arranged upstream or downstream of the right shoulder joint.

The position of the shoulder joint bone structure, for example the position of the free end of the shoulder joint bone structure relative to the center of the product carrier, provides an accurate indication of the size of the carcass part. By measuring the carcass part in the position with the left shoulder joint and right shoulder joint one behind the other as seen in the transport direction it is avoided that soft tissue from the back or the front of the carcass part or breast meat is pushed over the bone structure of the shoulder joint by the mechanical contact member. This increases the accuracy of the shoulder joint position measurement.

In addition, this orientation of the product carrier in accordance with the invention allows to arrange the mechanical contact member behind any breast meat that may extend beyond the top of the bone structure of the shoulder joints. This also increases the accuracy of the shoulder joint position measurement.

In addition, the system according to the invention can be designed to be less complex than the known system. For example, in a possible embodiment, the system according to the invention may contain just a single mechanical contact member and no additional product carrier measurement device for determining the movement, position or velocity of the product carrier. This embodiment already produces good and reliable measurement results.

In a possible embodiment, the product carrier is adapted to move past the position measurement device along the conveying path during the engaging of the shoulder joint bone structure by the mechanical contact member, or at least during the measurement of the shoulder joint position. In an alternative embodiment, the product carrier is adapted to be in a stationary position along the conveying path during the engaging of the shoulder joint bone structure by the mechanical contact member, or at least during the measurement of the shoulder joint position. In a further alternative embodiment, the product carrier is adapted to be stationary in the transport direction, but movable in a direction perpendicular to the transport direction during the engaging of the shoulder joint bone structure by the mechanical contact member, or at least during the measurement of the shoulder joint position.

In a possible embodiment, the mechanical contact member has a curved or bent shape which is adapted to move soft tissue and/or breast meat away from the shoulder joint bone structure.

For example, in particular in an embodiment in which the product carrier is adapted to support the carcass part with the shoulder joints pointing upwards, the mechanical contact member optionally has an upwardly curved leading edge and/or upwardly curved trailing edge. The leading edge is the edge that faces in the transport direction along the conveying path, and the trailing edge is the edge that faces in a direction opposite to the transport direction along the conveying path. If the product carrier is moved along the conveying path and the mechanical contact member is mounted, optionally moveably mounted, on a frame that is stationary relative to the conveying path, preferably the trailing edge of the mechanical contact member is curved upwardly.

In particular when during the engaging of the shoulder joint structure by the mechanical engagement member the product carrier moves the carcass part along the conveying path in the transport direction, the upwardly curved edge pushes soft tissue and/or meat which may accidentally has come to lie over the shoulder joint bone structure, away from the shoulder joint structure. This way, it is made possible that the mechanical contact member directly engages the shoulder joint bone structure during the measurement of the position of the carcass part, which improves the accuracy of the measurement. If the product carrier is adapted to support the carcass part with the shoulder joints pointing downwards, the mechanical contact member optionally has a downwardly curved leading edge and/or a downwardly curved trailing edge.

In this embodiment, the measurement of the position preferably takes place during a part of the time period during which the mechanical contact member engages one or both shoulder joint bone structures.

Alternatively or in addition, the mechanical contact member may have a U-shaped cross section perpendicular to the transport direction of the product carrier, or a similar cross sectional shape (again in a direction perpendicular to the transport direction of the product carrier) with a planar section which is adapted to engage a shoulder joint bone structure.

In a possible embodiment, the mechanical contact member is arranged relative to the conveying path of the product carrier such that during the measurement of the shoulder joint position, the mechanical contact member is arranged behind the breast meat.

In a possible embodiment, the mechanical contact member is moveable relative to the conveying path of the product carrier between a predetermined inactive position in which the mechanical contact member is not in engagement with a shoulder joint bone structure and a measurement position in which the mechanical contact member is in engagement with a shoulder joint bone structure such that a measurement can be carried out. In this embodiment, the measurement of the shoulder joint position is based on the distance between the inactive position and the measurement position. For example, the measurement of the shoulder joint position is based on the vertical distance between the inactive position and the measurement position For example, the mechanical contact member in its inactive position may be at the same level as a reference point, e.g. the center of the product carrier. When the mechanical contact member has been moved into its measurement position, for example by a passing carcass part, the vertical displacement of the mechanical contact member represents the vertical position of at least the one shoulder joint which is furthest away from the reference point of the product carrier. So, the measurement of the vertical displacement of the mechanical contact member corresponds to the measurement of the shoulder joint position. The mechanical contact member in its inactive position may alternatively be at a known distance from the reference point, e.g. the center, of the product carrier.

In a possible embodiment, the mechanical contact member is arranged at such a position relative to the conveying path that the carcass part displaces the mechanical contact member from the inactive position to the measurement position when the carcass part is moved past the position measurement device. In this embodiment, the carcass part, which is arranged on the product carrier, and the position measurement device move relative to each other. The product carrier moves in the transport direction.

For example, the mechanical contact member may be arranged at a distance to the conveying path which is smaller than the expected distance between the conveying path and the shoulder joints. When the product carrier moves the carcass part along the conveying path, the carcass part runs into the mechanical contact member and comes to engage the mechanical contact member. Upon further movement of the product carrier, which carries the carcass part, the mechanical contact member slides over the carcass part into engagement with at least one of the shoulder joint bone structures and therewith into the measurement position. Once the measurement position has been reached, the measurement of the position of the shoulder joints is carried out. The measurement of the position of the shoulder joints can take place during the entire time period during which the mechanical contact member engages one or both shoulder joint bone structures or during a part of that time period. During the measurement, in this embodiment the mechanical contact member continues to slide over the carcass part, and slides over at least one of the shoulder joint bone structures, for example over the shoulder joint bone structure which is the furthest away from the center of the product carrier. The sliding of the mechanical contact member over at least one of the shoulder joint bone structures ensures that any soft tissue or breast meat that was present on the respective shoulder joint bone structure is pushed away from the shoulder joint bone structure. This ensures an accurate measurement of the position of the shoulder joint.

The distance over which the mechanical contact member is displaced in one or more directions during its displacement from the inactive position to the measurement position provides forms in this embodiment the basis for the measurement of the position of the shoulder joint bone structures. For example, the displacement of the mechanical contact member may be in horizontal as well as in vertical direction, and the measurement of the position of the shoulder joint may be based only on the displacement of the mechanical contact member in vertical direction.

Optionally, the mechanical contact member is moveable over the length of a stroke in the transport direction of the product carrier. In that case, the carcass part may engage the mechanical contact member and take it along with it in the transport direction until the mechanical contact member has reached the end of its stroke. While the mechanical contact member is moved along its stroke in the transport direction, the mechanical contact member moves along with the product carrier in transport direction and also, at the same time, the mechanical contact member is displaced in a direction perpendicular to the direction of transport towards the measurement position due to the shape of the carcass part. After the mechanical contact member has reached the end of its stroke in the transport direction, the product carrier moves along further in the transport direction but the mechanical contact member does not move along in the transport direction any more.

In a possible embodiment, the system according to the invention comprises a contact member drive, which is adapted to move the mechanical contact member from its inactive position to its measurement position and/or vice versa.

In a possible embodiment, the mechanical contact member is connected to a base by two mutually parallel connector arms. These connector arms are pivotable relative to the base as well as pivotable relative to the mechanical contact member.

Optionally, the two connector arms have the same length. Optionally, the two connector arms, the mechanical contact member or a part thereof and the base or a part thereof together form a parallelogram. This way, tilting of the mechanical contact member is prevented. This increases the accuracy of the measurement of the shoulder joint position.

If, in this embodiment, there is a difference in vertical position between the left shoulder joint bone structure and the right shoulder joint bone structure, the mechanical contact member is likely to only engage a single shoulder joint bone structure at a time. In that case, the shoulder joint bone structures will be engaged by the mechanical contact member successively. This allows to determine the difference in position between the left shoulder joint and the right shoulder joint. If there is such a difference, for example the position of the shoulder joint which is farthest away from the center of the product carrier may be regarded as the shoulder joint position, or an average of the two may be used.

If the difference between the position of the two shoulder joints is too large, this may be used as an indication that the carcass part might have to be processed further in an a different way than carcass parts with a normal shape. For example, a large difference in shoulder joint position between the left shoulder joint and the right shoulder joint may be an indication that one or more bones in the shoulder region of the carcass part are broken, and that the carcass part has to be removed from the automated processing line, or has to bypass certain processing stations in the processing line downstream of the position measurement device.

If there is no difference in vertical position between the left and right shoulder joint bone structures, in this embodiment the mechanical contact member may engage both shoulder joint bone structures simultaneously.

In a variant of this embodiment, the mechanical contact member is arranged at such a position relative to the conveying path that the carcass part displaces the mechanical contact member from the inactive position to the measurement position when the carcass part is moved past the position measurement device. In this embodiment, the product carrier and the position measurement device move relative to each other. The product carrier moves in the transport direction.

A carcass part that in this variant is moved by a product carrier past the mechanical contact member, will displace the mechanical contact member both in the transport direction and perpendicular to the transport direction. The measurement of the shoulder joint position is based on the displacement of the mechanical contact member in the direction perpendicular to the transport direction.

In a possible embodiment, the mechanical contact member is connected to a base by two mutually parallel connector arms which are pivotable relative to the base as well as pivotable relative to the mechanical contact member, and the position measurement device comprises a detector which is adapted to determine the pivot angle over which at least one connector arm is pivoted due to the displacement of the mechanical contact member by the carcass part.

Optionally, the two connector arms have the same length. Optionally, the two connector arms, the mechanical contact member or a part thereof and the base or a part thereof together form a parallelogram. This way, tilting of the mechanical contact member is prevented. This increases the accuracy of the measurement of the shoulder joint position.

In a possible embodiment, the system according to the invention comprises an abutment, which is adapted to engage the mechanical contact member when the mechanical contact member is in its inactive position.

In an embodiment in which the mechanical contact member is connected to a base by two mutually parallel connector arms which are pivotable relative to the base as well as pivotable relative to the mechanical contact member, optionally an abutment is provided which is adapted to engage a connector arm when the mechanical contact member is in its inactive position.

In a possible embodiment, the product carrier is stationary relative to the mechanical contact member in the transport direction during the measurement of the shoulder joint position. Both the product carrier and the mechanical contact member may be stationary in the transport direction during the measurement of the shoulder joint position, or the product carrier and the mechanical contact member may move at the same velocity in the transport direction during the measurement of the shoulder joint position as would for example be the case when the mechanical contact member would be arranged in a carrousel machine.

For example, when the transport direction extends in a horizontal plane, the mechanical contact member may be moveable relative to the conveying path of the product carrier in a vertical direction. Initially, the mechanical contact member is in its inactive position, which is away from the conveying path of the product carrier. When an empty product carrier or a product carrier with a carcass part that does not have to be measured is moved past the mechanical contact member, the mechanical contact member preferably remains in its inactive position and does not engage the carcass part and/or product carrier. When a carcass part arrives at the position measurement device, either the product carrier stops its movement in the transport direction or the mechanical contact member moves along with the product carrier. The mechanical contact member then moves towards the carcass part, e.g. along a guide, e.g. in vertical direction, until it engages at least one, for example at least the one furthest away from the center or other reference point of the product carrier, of the shoulder joint bone structures of the carcass part. When the mechanical contact member engages the shoulder joint bone structure, the mechanical contact member is in its measurement position and the measurement of the shoulder joint position takes place. The measurement of the shoulder joint position is based on the displacement, e.g. the vertical displacement, of the mechanical contact member from its inactive position to its measurement position.

In a possible embodiment, the product carrier is moveable in a plane which is generally perpendicular to the conveying path between a predetermined inactive carrier position in which the mechanical contact member is not in engagement with a shoulder joint bone structure and an measurement carrier position in which the mechanical contact member is in engagement with a shoulder joint bone structure. The measurement of the position of the shoulder joint takes place while the carrier is in the active carrier position. In this embodiment, the measurement of the shoulder joint position is based on the distance between the inactive carrier position and the measurement carrier position.

In a variant of this embodiment, the system is provided with a trolley, which is moveable along the conveying path in the transport direction. The product carrier is connected to the trolley so that the product carrier moves along with the trolley along the conveying path in the transport direction. The connection between the product carrier and the trolley is such that the product carrier is moveable relative to the product carrier in a plane which is generally perpendicular to the conveying path, for example by means of a cylinder and/or along a slide.

In a possible embodiment, the position measurement device further comprises a biasing element. The biasing element is adapted to provide a biasing force to the mechanical contact member which biasing force is directed towards the conveying path. This ensures good contact between the shoulder joint bone structures and the mechanical contact member and therewith contributes to an accurate measurement of the shoulder joint position.

For example, the biasing element comprises a spring or a weight.

In a possible embodiment, the system further comprises a reference, which is for example a reference point or reference line, e.g. the center or a carrier rotation axis of a product carrier. In this embodiment, optionally, the measurement of the shoulder joint position includes the determination of the distance between the reference and at least one shoulder joint bone structure, for example between a reference point on a product carrier and the free end of at least one shoulder joint bone structure.

In this embodiment, the inactive position of the mechanical contact member is arranged at a known distance from the reference. The known distance between the inactive position of the mechanical contact member and the reference can be zero or other than zero.

Optionally, the inactive position of the mechanical contact member is arranged at a known vertical distance from the reference.

Optionally, the inactive position of the mechanical contact member is arranged at a known distance from the reference in a measurement direction, which is the direction of displacement of the mechanical contact member between the inactive position and the measurement position on which the determination of the shoulder joint position is based.

In a possible embodiment, the position measurement device further comprises a detector which is adapted to generate a measurement signal, e.g. based on a displacement of the mechanical contact member.

In a possible embodiment, the mechanical contact member is moveable relative to the conveying path of the product carrier between a predetermined inactive position—in which the mechanical contact member is not in engagement with a shoulder joint bone structure—and a measurement position—in which the mechanical contact member is in engagement with a shoulder joint bone structure such that a measurement can be carried out—, and the measurement of the shoulder joint position is based on the distance between the inactive position and the measurement position. In this embodiment, the position measurement device further comprises a detector which is adapted to determine the distance between the inactive position and the measurement position and to generate a measurement signal based on this determined distance between the inactive position and the measurement position of the mechanical contact member.

In this embodiment, the position measurement device optionally comprises an input member, which is moveable and which is adapted to be operated by the mechanical contact member. For example, the movement of the mechanical contact member results in a movement of the input member of the detector, for example because the mechanical contact member is directly or indirectly connected to the input member.

The position measurement device further optionally comprises a processor, which is adapted to convert the movement of the input member into a measurement signal.

The position measurement device further optionally comprises an output terminal which is optionally connected to a processor via a data connection to transfer the measurement signal to a controller, e.g. to a processing controller which is adapted to control a processing line for processing the carcass parts after the shoulder joint position has been measured. The data connection may comprise a data transfer wire or a wireless data connection.

The invention further pertains to a poultry processing system which comprises a system for measuring a shoulder joint position of a carcass part of slaughtered poultry according to the invention. For example, the poultry processing system comprises an embodiment of a system for measuring a shoulder joint position of a carcass part of slaughtered poultry as described above or below.

The poultry processing system further comprises a processing station which is adapted to carry out a processing operation on the carcass part. The processing station is arranged along the conveying path of the product carrier, downstream of the position measurement device of the system for measuring a shoulder joint position.

Optionally, the poultry processing system comprises a system for measuring a shoulder joint position of a carcass part of slaughtered poultry according to the invention which comprises multiple product carriers, which are part of a conveyor system.

In a possible embodiment of the poultry processing system according to the invention, an embodiment of the system for measuring a shoulder joint position of a carcass part of slaughtered poultry according to the invention is present in which the position measurement device further comprises a detector which is adapted to generate a measurement signal. The detector is linked to the mechanical contact member, for example by a mechanical connection or an optical sensor, allowing the detector to generate a measurement signal based on the displacement of the mechanical contact member. In this embodiment of the poultry processing system according to the invention, the poultry processing system further comprises a processing controller. The processing controller is connected to the position measurement device by a first data connection. The first data connection is adapted to transfer the measurement signal from the position measurement device to the processing controller. The first data connection optionally comprises a first data transfer wire or a wireless data connection.

In this embodiment, the processing controller is adapted to generate a control signal based on the measurement signal. The processing controller is connected to the processing station by a second data connection which is adapted to transfer the control signal from the processing controller to the processing station. The second data connection optionally comprises a first data transfer wire or a wireless data connection. The processing operation on the carcass part in the processing station may then be controlled by the control signal, or by a combination of signals comprising the control signal.

In a possible embodiment, the poultry processing system according to the invention comprises an embodiment of the system for measuring a shoulder joint position of a carcass part of slaughtered poultry according to the invention, in which embodiment the mechanical contact member is moveable relative to the conveying path of the product carrier between a predetermined inactive position—in which the mechanical contact member is not in engagement with a shoulder joint bone structure—and a measurement position—in which the mechanical contact member is in engagement with a shoulder joint bone structure such that a measurement can be carried out—, and the measurement of the shoulder joint position is based on the distance between the inactive position and the measurement position. The position measurement device further comprises a detector which is adapted to determine the distance between the inactive position and the measurement position and to generate a measurement signal based on this determined distance between the inactive position and the measurement position of the mechanical contact member.

In this embodiment, the poultry processing system further comprises a processing station which is adapted to carry out a processing operation on the carcass part. The processing station is arranged along the conveying path of the product carrier, downstream of the position measurement device of the system for measuring a shoulder joint position.

In this embodiment, the poultry processing system further comprises a processing controller. The processing controller is connected to the position measurement device by a first data connection. The first data connection is adapted to transfer the measurement signal from the position measurement device to the processing controller. The first data connection optionally comprises a first data transfer wire or a wireless data connection.

In this embodiment, the processing controller is adapted to generate a control signal based on the measurement signal. The processing controller is connected to the processing station by a second data connection which is adapted to transfer the control signal from the processing controller to the processing station. The second data connection optionally comprises a first data transfer wire or a wireless data connection. The processing operation on the carcass part in the processing station may then be controlled by the control signal, or by a combination of signals comprising the control signal.

In a possible embodiment of the poultry processing system according to the invention, the product carrier is pivotable about a carrier rotation axis into a position in which the carcass part is supported with the shoulder joints directed in the downstream direction of the conveying path. In this embodiment, the poultry processing system comprises a turning station which is adapted to pivot the product carrier from a position in which the left shoulder joint and right shoulder joint of the carcass part are arranged one behind the other as seen in the transport direction into the position in which the carcass part is supported with the shoulder joints directed in the downstream direction of the conveying path. The turning station is arranged between the position measurement device of the system for measuring a shoulder joint position and the processing station.

In a possible embodiment of the poultry processing system according to the invention, the processing station comprises a processing tool which is moveable between an inactive position and an operational position. In this embodiment, the processing controller is adapted to control the movement of the processing tool between the inactive position and the operational position by the generated control signal.

In a possible embodiment of the poultry processing system according to the invention, the measurement of the shoulder joint position is used as a product detection, to determine whether a carcass part is present on an individual product carrier or not.

In a possible variant of this embodiment, for example, an embodiment of the system for measuring a shoulder joint position of a carcass part of slaughtered poultry according to the invention is present in which the position measurement device further comprises a detector which is adapted to generate a measurement signal. The detector is linked to the mechanical contact member, for example by a mechanical connection or an optical sensor, allowing the detector to generate a measurement signal based on the displacement of the mechanical contact member. If a carcass part is present on a product carrier, the displacement of the mechanical contact member will be significantly higher than if no carcass part is present on that product carrier.

In this variant of the poultry processing system according to the invention, the poultry processing system further comprises a processing controller. The processing controller is connected to the position measurement device by a first data connection. The first data connection is adapted to transfer the measurement signal from the position measurement device to the processing controller. The first data connection optionally comprises a first data transfer wire or a wireless data connection.

In this variant, the processing controller is adapted to generate a control signal based on the measurement signal. If a relatively small displacement of the mechanical contact member is measured, the control signal will indicate that no carcass part is present on the product carrier. If a relatively large displacement of the mechanical contact member is measured, the control signal will indicate that a carcass part is present on the product carrier.

The processing controller is connected to the processing station by a second data connection which is adapted to transfer the control signal from the processing controller to the processing station. The second data connection optionally comprises a first data transfer wire or a wireless data connection. Optionally, in this variant, the processing station will only be activated if a product carrier arrives at this processing station of if the control signal indicates that a carcass part is present on that particular product carrier.

The invention further pertains to a method for measuring a shoulder joint position of a carcass part of slaughtered poultry. The carcass part comprises a left shoulder joint, a right shoulder joint, soft tissue adjacent the left and/or right shoulder joints and at least a part of the breast meat adjacent the left and/or right shoulder joints. The left shoulder joint and the right shoulder joint each contain a shoulder joint bone structure.

The method comprises the following steps:
arranging the carcass part on a product carrier which is moveable in a transport direction along a conveying path which product carrier is adapted to support the carcass part during movement along the conveying path,
moving the product carrier with the carcass part supported thereon into a position relative to a position measurement device, which position measurement device comprises a mechanical contact member, and bringing the mechanical contact member into engagement with at least one of the left and right shoulder joint and during this engagement, measuring the shoulder joint position.

The method according to the invention is characterized in that the product carrier during the measurement of the shoulder joint position is arranged such that the carcass part is arranged relative to the position measurement device with the left shoulder joint and right shoulder joint one behind the other as seen in the transport direction so as to allow the mechanical contact member to engage a shoulder joint bone structure of at least one of the left and right shoulder joint.

The method according to the invention is suitable for measuring the shoulder joint position of a carcass part which comprises a left shoulder joint, a right shoulder joint, soft tissue adjacent the left and/or right shoulder joints and at least a part of the breast meat adjacent the left and/or right shoulder joints. The left shoulder joint and the right shoulder joint each contain a shoulder joint bone structure.

Examples of such carcass parts are breast caps and front halves. The measurement of the shoulder joint position may for example include the determination of the distance between a reference point, e.g. the center or a carrier rotation axis of a product carrier, to the free end of at least one shoulder joint bone structure.

Preferably, the neck has been removed from the carcass part prior to measuring the shoulder joint position with the method according to the invention. Alternatively, the neck may be still present, but preferably it is partly cut loose and/or moved away from the area of the carcass part between the shoulder joints, for example by arranging it inside the body cavity of the carcass part or on the back of the carcass part, or by pushing the shoulder joints forward (i.e. towards the breast side of the carcass part) relative to the neck.

In the method according to the invention, the carcass part is arranged on a product carrier which is moveable in a transport direction along a conveying path The product carrier is adapted to support the carcass part during movement along the conveying path.

In the method according to the invention, the product carrier with the carcass part supported thereon is moved into a position relative to a position measurement device. The position measurement device comprises a mechanical contact member. The mechanical contact member is brought into engagement with at least one of the left and right shoulder joint. During this engagement, the shoulder joint position is measured.

The method according to the invention is characterized in that the product carrier during the measurement of the shoulder joint position is arranged such that the carcass part is arranged relative to the position measurement device with the left shoulder joint and right shoulder joint one behind the other as seen in the transport direction so as to allow the mechanical contact member to engage a shoulder joint bone structure of at least one of the left and right shoulder joint.

This arrangement of the product carrier allows the mechanical contact member to engage a shoulder joint bone structure of at least one of the left and right shoulder joint. When the mechanical contact member engages the shoulder joint one structure, the measurement of the position of the shoulder joint takes place. The measurement of the position can take place during the entire time period during which the mechanical contact member engages one or both shoulder joint bone structures or during a part of that time period. The position of the carcass part, during the measurement and/or during the time that the mechanical contact member engages at least one of the shoulder joint bone structures, may be such that left shoulder joint is arranged upstream or downstream of the right shoulder joint.

The position of the shoulder joint bone structure, for example the position of the free end of the shoulder joint bone structure relative to the center of the product carrier, provides an accurate indication of the size of the carcass part. By measuring the carcass part in the position with the left shoulder joint and right shoulder joint one behind the other as seen in the transport direction it is avoided that soft tissue from the back or the front of the carcass part or breast meat is pushed over the bone structure of the shoulder joint by the mechanical contact member.

In addition, this orientation of the product carrier in accordance with the invention allows to arrange the mechanical contact member behind any breast meat that may extend beyond the top of the bone structure of the shoulder joints. This also increases the accuracy of the shoulder joint position measurement.

In a possible embodiment of the method according to the invention, the carcass part is moved along the conveying path in the transport direction during the engagement of the mechanical contact member with the shoulder joint and/or during the measurement of the shoulder joint position. Alternatively, the carcass part is held stationary relative to the conveying path in the transport direction during the engagement of the mechanical contact member with the shoulder joint and/or during the measurement of the shoulder joint position.

Optionally, the mechanical contact member moves soft tissue away from the shoulder joint bone structure upon the carcass part passing the position measurement device.

In a possible embodiment of the method according to the invention, the mechanical contact member is moved relative to the conveying path of the product carrier between a predetermined inactive position in which the mechanical contact member is not in engagement with a shoulder joint bone structure and a measurement position in which the mechanical contact member is in engagement with a shoulder joint bone structure. The measurement of the shoulder joint position is based on the distance between the inactive position and the measurement position.

In a possible embodiment of the method according to the invention, the carcass part displaces the mechanical contact member from the inactive position to the measurement position upon the movement of the carcass part past the position measurement device.

In a possible embodiment of the method according to the invention, the method further comprises the steps of:
generating a measurement signal based on the determined distance between the inactive position and the measurement position of the mechanical contact member,
transferring the measurement signal to a processing controller,
in the processing controller, transforming the measurement signal into a control signal,
transferring the control signal to a processing station,
carrying out a processing operation on the carcass part in the processing station, which processing operation is controlled by the control signal.

Optionally, the processing station comprises a cutter for making an incision, and the depth of the incision is controlled by the control signal.

In a possible embodiment of the method according to the invention, the method further comprises the following steps:
downstream of the position measurement device, pivoting the product carrier about a horizontal carrier rotation axis into a position in which the shoulder joints are directed in the downstream direction of the conveying path as seen in the transport direction of the product carrier,
moving the product carrier to a processing station which comprises a processing tool which is moveable between an inactive position and an operational position,
triggering movement of the processing tool from the inactive position into the operational position by a tool activation signal, wherein timing of the tool activation signal is based on the position measurement.

For example, the control signal that is generated by the processing controller can be a tool activation signal.

In a possible embodiment of the method according to the invention, the mechanical contact member is arranged behind the breast meat during the measurement of the shoulder joint position.

In a possible embodiment of the method according to the invention, during the measurement of the shoulder joint position the carcass part passes the position measurement device at such a distance that the mechanical contact member is located behind the breast meat.

The invention will be described in more detail below under reference to the drawing, in which in a non-limiting manner exemplary embodiments of the invention will be shown.

The drawing in:

FIG. 1: illustrates an example of a carcass part of slaughtered poultry on a product carrier, FIG. 2: illustrates an example of a carcass part of slaughtered poultry on a product carrier, in side view, FIG. 3: illustrates a first embodiment of a system for measuring a shoulder joint position in accordance with the invention, FIG. 4: illustrates a variant of the embodiment of FIG. 3, with the mechanical contact member shown in the measurement position, FIG. 5A and FIG. 5B: illustrate examples of measurement signals, FIG. 6: illustrates a second exemplary embodiment of the system for measuring a shoulder joint position in accordance with the invention, FIG. 7: illustrates a third exemplary embodiment of the system for measuring a shoulder joint position in accordance with the invention, FIG. 8: illustrates a variant of the embodiment of FIG. 7, FIG. 9A: illustrates a breast cap on an alternative carrier, FIG. 9B: illustrates the variant of FIG. 8 in combination with a plurality of carriers according to FIG. 9A, FIG. 10: illustrates a first embodiment of poultry processing system according to the invention, FIG. 11: illustrates a second embodiment of poultry processing system according to the invention.

FIG. 1 illustrates an example of a carcass part 1 of slaughtered poultry on a product carrier 10.

The carcass part 1 which is shown in FIG. 1 by way of example is a breast cap. It comprises a left shoulder joint 2, a right shoulder joint 3, soft tissue 4 adjacent the shoulder joints 2,3 and at least a part of the breast meat 5 adjacent the shoulder joints. The left shoulder joint 2 and the right shoulder joint 3 each contain a shoulder joint bone structure 6,7. The soft tissue 4 may be present over one or both shoulder joint bone structures 6,7.

FIG. 1 further shows that the carcass part 1 is arranged on a product carrier 10. The product carrier 10 is moveable in a transport direction 11 along a conveying path 12. The product carrier 10 is adapted to support the carcass part 1 during movement along the conveying path 12.

FIG. 2 illustrates an example of a carcass part of slaughtered poultry on a product carrier, in side view.

In the example of FIG. 2, the carcass part 1 is again a breast cap. It comprises a left shoulder joint (not visible), a right shoulder joint 3, soft tissue 4 adjacent the shoulder joints and at least a part of the breast meat 5 adjacent the shoulder joints. The right shoulder joint 3 contains a shoulder joint bone structure 7. Likewise, the left shoulder joint contains a shoulder joint bone structure. The soft tissue 4 may be present over one or both shoulder joint bone structures.

In the example of FIG. 2, the carcass part 1 is a relatively large carcass part which contains quite a significant volume 5* of breast meat 5 in the vicinity of the shoulder joints. This volume 5* of breast meat 3 extends above the shoulder joints.

FIG. 2 further shows that the carcass part 1 is arranged on a product carrier 10. The product carrier 10 is moveable in a transport direction along a conveying path. The product carrier 10 is adapted to support the carcass part 1 during movement along the conveying path.

FIG. 3 shows a first embodiment of a system for measuring a shoulder joint position in accordance with the invention.

FIG. 3 shows two carcass parts 1, in this case breast caps, each comprising a left shoulder joint 2 and a right shoulder joint 3, each breast cap being mounted on a product carrier. The product carrier has a reference point 10*, which is schematically indicated by two crossing dash-dot lines. The product carrier 10 is moveable in a transport direction 11 along a conveying path 12. The product carrier 10 is adapted to support the carcass part 1 during movement along the conveying path 12.

The embodiment shown in FIG. 3 comprises a position measurement device 20. The position measurement device 20 comprises a mechanical contact member 25 which is adapted to engage at least one, in this case at least the highest, of the left and right shoulder joint 2,3 during the measurement of the shoulder joint position. In the embodiment of FIG. 3, the mechanical contact member 25 has a curved or bent shape.

In the embodiment of FIG. 3, the mechanical contact member 25 is connected to a base 23 by two mutually parallel connector arms 21, 22. These connector arms 21,22 are pivotable relative to the base 23 as well as pivotable relative to the mechanical contact member 25.

In the embodiment of FIG. 3, the two connector arms 21,22 have the same length, i.e. the distance between the pivot points is the same for both connector arms 21, 22. As can be seen in FIG. 3, the two connector arms 21, 23, the mechanical contact member 25 and the base 23 together form a parallelogram. This way, tilting of the mechanical contact member 25 is prevented. This increases the accuracy of the measurement of the shoulder joint position.

In the embodiment of FIG. 3, the mechanical contact member 25 is moveable relative to the conveying path 12 of the product carrier 10 between a predetermined inactive position in which the mechanical contact member 25 is not in engagement with a shoulder joint bone structure and a measurement position in which the mechanical contact member 25 is in engagement with a shoulder joint bone structure such that a measurement can be carried out. FIG. 3 shows the mechanical contact member in the inactive position.

In the embodiment of FIG. 3, the lower face of the mechanical contact member 25 in its inactive position is at the same level as the reference point 10* of the product carrier.

In the embodiment of FIG. 3, the carcass parts 1 are moved by the product carriers in the transport direction 11. When the carcass part 1 shown on the left hand side in FIG. 3 progresses in the transport direction 11, it will come into engagement with the trailing end of the mechanical contact member 25. The trailing edge is the edge that faces in a direction opposite to the transport direction 11 along the conveying path 12. Upon further progression of the product carrier that supports this carcass part 1, the carcass part moves the mechanical contact member 25 out of its inactive position and into its measurement position.

In the embodiment of FIG. 3, the mechanical contact member 25 is arranged at such a position relative to the conveying path 12 that the carcass part 1 displaces the mechanical contact member 25 from the inactive position to the measurement position when the carcass part 1 is moved past the position measurement device 20.

In the embodiment of FIG. 3, the mechanical contact member 25 is in its inactive position arranged at a distance to the conveying path which is smaller than the expected distance between the conveying path and the shoulder joints. When the product carrier moves the carcass part 1 along the conveying path 12, the carcass part 1 runs into the mechanical contact member 25 and comes to engage the mechanical contact member 25. Upon further movement of the product carrier, which carries the carcass part 1, the mechanical contact member 25 slides over the carcass part 1 into engagement with at least one of the shoulder joint bone structures 6,7 and therewith into the measurement position. Once the measurement position has been reached, the measurement of the position of the shoulder joints 2, 3 is carried out. The measurement of the position of the shoulder joints 2, 3 can take place during the entire time period during which the mechanical contact member 25 engages one or both shoulder joint bone structures 6,7 or during a part of that time period.

During the measurement, in this embodiment the mechanical contact member 25 continues to slide over the carcass part 1, and slides over at least one of the shoulder joint bone structures 6, 7, in particular over the highest of the shoulder joint bone structures 6, 7. The sliding of the mechanical contact member 25 over at least one of the shoulder joint bone structures 6, 7 ensures that any soft tissue 4 or breast meat 5 that was present on the respective shoulder joint bone structure 6, 7 is pushed away from the shoulder joint bone structure 6, 7. This ensures an accurate measurement of the position of the shoulder joint 2,3.

The distance over which the mechanical contact member 25 is displaced in vertical direction during its displacement from the inactive position to the measurement position provides forms in this embodiment the basis for the measurement of the position of the shoulder joint bone structures 6,7.

In the embodiment shown in FIG. 3 the mechanical contact member 25 in its inactive position is at the same level as the reference point 10* of the product carrier. When the mechanical contact member 25 has been moved into its measurement position by a passing carcass part 1, the vertical displacement of the mechanical contact member 25 represents the vertical position of at least the highest of the shoulder joints 2, 3 relative to the reference point 10* of the product carrier. So, the measurement of the vertical displacement of the mechanical contact member 25 corresponds to the measurement of the shoulder joint position.

In the embodiment of FIG. 3, the mechanical contact member 25 remains horizontal during the entire time it engages the carcass part 1. When one shoulder joint 2,3 is at higher vertical position than the other one, the mechanical contact member 25 will engage only one shoulder joint at a time. In that case, the shoulder joint bone structures 6,7 will be engaged by the mechanical contact member 25 successively. This allows to determine the difference in position between the left shoulder joint and the right shoulder joint. If there is such a difference, for example the vertical position of the highest shoulder joint may be regarded as the shoulder joint position, or an average of the two may be used.

If the difference in vertical position between the two shoulder joints is too large, this may be used as an indication that the carcass part should not be processed further in an automated processing line.

If there is no difference in vertical position between the left and right shoulder joint bone structures 6,7, the mechanical contact member 25 will engage both shoulder joint bone structures 6.7 simultaneously.

In the embodiment of FIG. 3, an additional weight 26 has been provided onto the mechanical contact member 25. This additional weight 26 biases the mechanical contact member 25 towards its inactive position, which ensures good contact between the shoulder joint bone structures 6,7 and the mechanical contact member 25, and therewith contributes to an accurate measurement of the shoulder joint position.

FIG. 4 shows a variant of the embodiment of FIG. 3, with the mechanical contact member 25 shown in the measurement position.

The main difference with the embodiment of FIG. 3 is that in the variant of FIG. 4, the mechanical contact member 25 in its inactive position is not at the same level as the reference point 10* of the product carrier but at a known distance from the reference point 10* of the product carrier.

Like in the embodiment of FIG. 3, the mechanical contact member 25 is arranged at such a position relative to the conveying path 12 that the carcass part 1 displaces the mechanical contact member 25 from the inactive position to the measurement position when the carcass part 1 is moved past the position measurement device 20.

So, also in the variant of FIG. 4, the mechanical contact member 25 is in its inactive position arranged at a distance to the conveying path which is smaller than the expected distance between the conveying path and the shoulder joints. When the product carrier moves the carcass part 1 along the conveying path 12, the carcass part 1 runs into the mechanical contact member 25 and comes to engage the mechanical contact member 25. Upon further movement of the product carrier, which carries the carcass part 1, the mechanical contact member 25 slides over the carcass part 1 into engagement with at least one of the shoulder joint bone structures 6,7 and therewith into the measurement position. Once the measurement position has been reached, the measurement of the position of the shoulder joints 2, 3 is carried out. The measurement of the position of the shoulder joints 2, 3 can take place during the entire time period during which the mechanical contact member 25 engages one or both shoulder joint bone structures 6,7 or during a part of that time period.

During the measurement, in this embodiment the mechanical contact member 25 continues to slide over the carcass part 1, and slides over at least one of the shoulder joint bone structures 6, 7, in this example over the highest of the shoulder joint bone structures 6, 7. The sliding of the mechanical contact member 25 over at least one of the shoulder joint bone structures 6, 7 ensures that any soft tissue 4 or breast meat 5 that was present on the respective shoulder joint bone structure 6, 7 is pushed away from the shoulder joint bone structure 6, 7. This ensures an accurate measurement of the position of the shoulder joint 2,3. As can be seen in the carcass part 1 on the right hand side in FIG. 4, the soft tissue 4 has been pushed away from the shoulder joint bones structures 6,7 by the mechanical contact member 25.

The distance over which the mechanical contact member 25 is displaced in vertical direction during its displacement from the inactive position to the measurement position provides forms in this embodiment the basis for the measurement of the position of the shoulder joint bone structures 6,7.

The vertical distance between the reference point 10* of the carrier and the mechanical contact member 25 in its inactive position, e.g. the vertical distance between the reference point 10* of the carrier and the lower surface of the mechanical contact member 25 in its inactive position, is known.

The vertical distance over which the mechanical contact member 25 from the inactive position into the measurement position as caused by the passing carcass part 1 is measured. Combined with the information about the known vertical distance between the reference point 10* of the carrier and the mechanical contact member 25 in its inactive position, this results in a determined position 30 of at least one of the shoulder joints 2,3. Due to the particular construction of the variant shown in FIG. 4, the mechanical contact member 25 will remain horizontal, so if there is a difference in vertical position between the left shoulder joint bone structure 6 and the right shoulder joint bone structure 7, the mechanical contact member 25 will only engage with a single shoulder joint bone structure at a time, so the shoulder joint bone structures 6,7 will be engaged by the mechanical contact member 25 successively. If there is no difference in vertical position between the left and right shoulder joint bone structures 6,7, the mechanical contact member 25 will engage both shoulder joint bone structures 6,7 simultaneously.

In the variant of FIG. 4, a detector 24 is shown that forms part of the position measurement device 20. The detector 24 is adapted to determine the pivot angle over which connector arm 21 is pivoted due to the displacement of the mechanical contact member 25 by the carcass part 1.

The detector 24 is mechanically connected to connector arm 21 and has an input member which pivots along with the connector arm 21. The angle over which input member is pivoted is detected by the detector, e.g. by an optical, electrical or magnetic device. Based on the detected pivot angle of the input member, the detector generates a measurement signal. This way, the measurement signal is based on the determined distance between the inactive position and the measurement position of the mechanical contact member 25.

Such a detector may likewise be provided in the embodiment of FIG. 3.

In the variant of FIG. 4, an additional weight 26 has been provided onto the mechanical contact member 25. This additional weight 26 biases the mechanical contact member 25 towards its inactive position, which ensures good contact between the shoulder joint bone structures 6,7 and the mechanical contact member 25, and therewith contributes to an accurate measurement of the shoulder joint position.

In the variant of FIG. 4, an abutment 32 has been provided. When the mechanical contact member 25 is in its inactive position, the connector arm 21 rests against the abutment 32. The abutment 32 supports the connector arm 21 when the mechanical contact member 25 is in its inactive position. In this variant, the abutment 32 keeps the connector arms 21, 22 positioned in such a way that the mechanical contact member 25 is kept in the desired and known inactive position when it does not engage a carcass part 1.

FIG. 5A shows an example of a measurement signal 31 as can for example be generated by the detector 24 as shown in FIG. 4. In the example of FIG. 5A, the vertical distance between a reference point of the product carrier and the free end of the shoulder joint bone structure are similar for the left shoulder joint and the right shoulder joint.

Figure 5A:
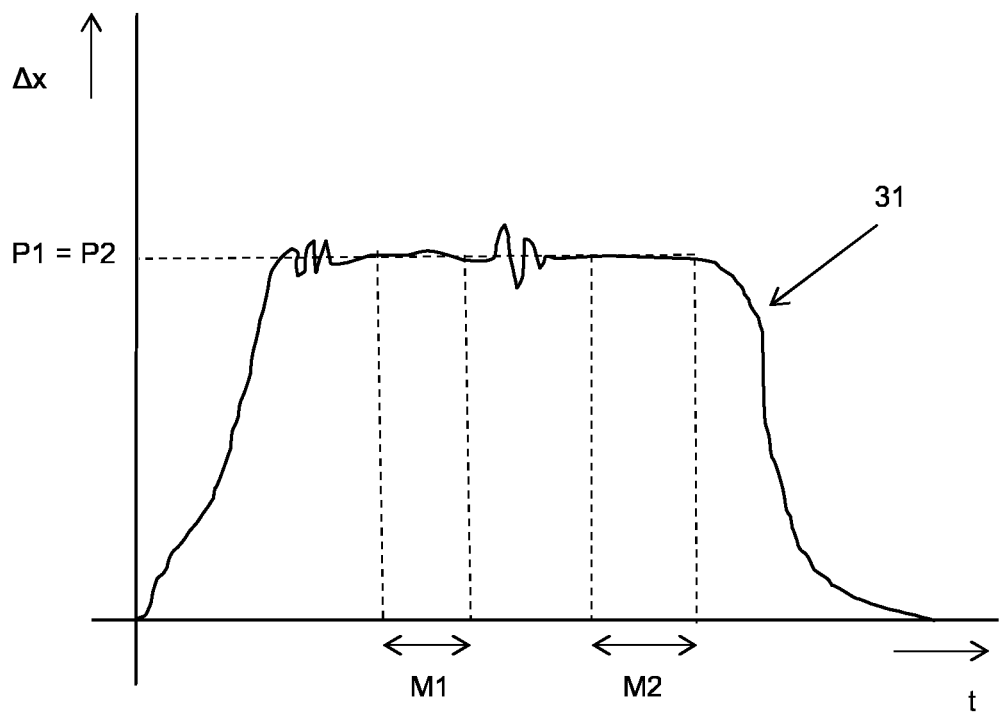
FIG. 5A and FIG. 5B show examples of measurement signals as can be obtained by a system for measuring a shoulder joint position of a carcass part of slaughtered poultry in accordance with the invention, for example with the embodiment as shown in FIG. 3 or the variant as shown in FIG. 4.

In the graph of FIG. 5A, the time t is plotted on the horizontal axis and the vertical displacement Δx of the mechanical contact member 25 relative to the inactive position has been plotted onto the vertical axis.

The start of the signal 31 corresponds to the first contact between the mechanical contact member 25 and the carcass part 1. As the carcass part 1 is moved on along the conveying path by the product carrier, the carcass part 1 displaces the mechanical contact member 25 more and more from its inactive position.

The signal 31 stabilizes when the mechanical contact member 25 reaches the first shoulder joint bone structure. When the signal has stabilized and the mechanical contact member 25 engages the first shoulder joint bone structure, the vertical displacement of the mechanical contact member 25 relative to the inactive position is measured during first measuring time interval M1. The measuring result is indicated as P1 in FIG. 5A.

After the first measuring time interval M1, signal may become a little instable again, and then stabilize again when the mechanical contact member 25 reaches the second shoulder joint bone structure. When the signal has stabilized and the mechanical contact member 25 engages the second shoulder joint bone structure, the vertical displacement of the mechanical contact member 25 relative to the inactive position is measured during second measuring time interval M2. The measuring result is indicated as P2 in FIG. 5A.

The start of the measuring time intervals M1, M2 may be triggered by the stabilizing of the signal, or may be triggered after a predetermined time from the first displacement of the mechanical contact member 25 out of its inactive position. The measuring time intervals M1, M2 will generally have a fixed length.

Alternatively, the start of the measuring time intervals M1, M2 may be triggered by an external sensor, which detects the presence of a product carrier and/or carcass part at a certain point along the processing line. The detection may trigger an immediate start of a measuring time interval, or a measuring time interval may start after a predetermined time interval or in a predetermined time window from the detections of the product carrier and/or carcass part.

Figure 4:
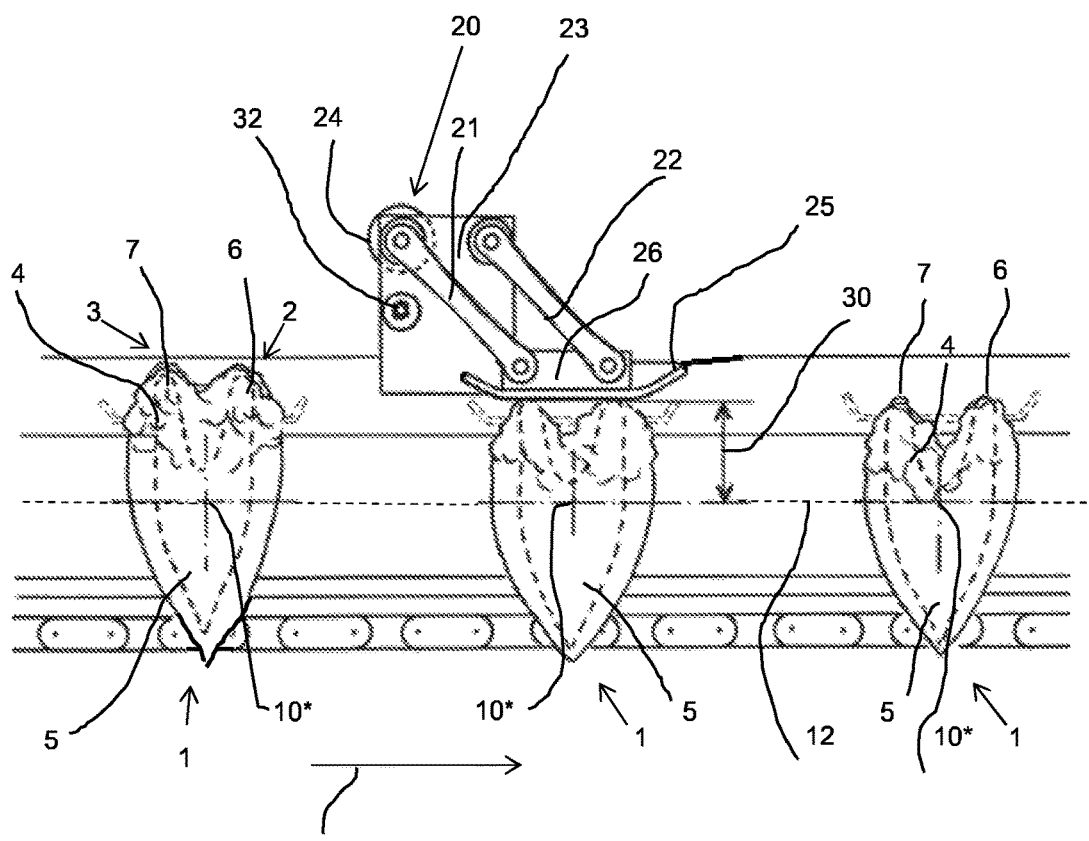
Figure 5B:
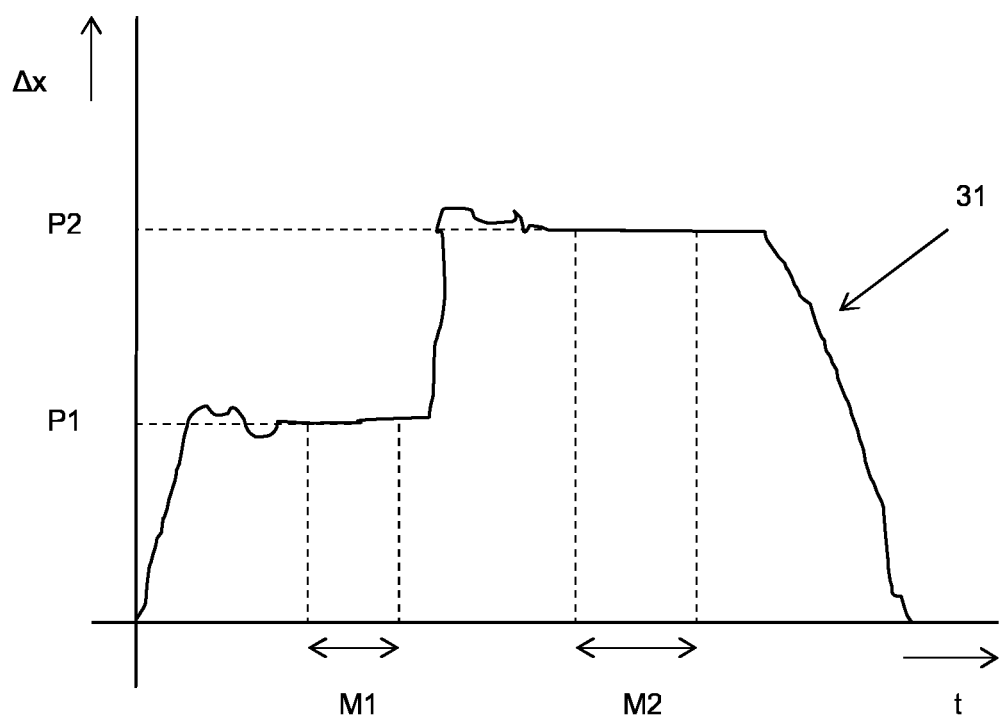

FIG. 5B shows an example of a measurement signal 31 as can for example be generated by the detector 24 as shown in FIG. 4. In the example of FIG. 5B, the vertical distance between a reference point of the product carrier and the free end of the shoulder joint bone structure are different for the left shoulder joint and the right shoulder joint. This may for example occur due to one or more broken bones in vicinity of the shoulder joint. In the graph of FIG. 5B, the time t is plotted on the horizontal axis and the vertical displacement Δx of the mechanical contact member 25 relative to the inactive position has been plotted onto the vertical axis.

The start of the signal 31 corresponds to the first contact between the mechanical contact member 25 and the carcass part 1. As the carcass part 1 is moved on along the conveying path by the product carrier, the carcass part 1 displaces the mechanical contact member 25 more and more from its inactive position.

The signal 31 stabilizes when the mechanical contact member 25 reaches the first shoulder joint bone structure. When the signal has stabilized and the mechanical contact member 25 engages the first shoulder joint bone structure, the vertical displacement of the mechanical contact member 25 relative to the inactive position is measured during first measuring time interval M1. The measuring result is indicated as P1 in FIG. 5B.

After the first measuring time interval M1, signal may become a little instable again, and then stabilize again when the mechanical contact member 25 reaches the second shoulder joint bone structure. When the signal has stabilized and the mechanical contact member 25 engages the second shoulder joint bone structure, the vertical displacement of the mechanical contact member 25 relative to the inactive position is measured during second measuring time interval M2. The measuring result is indicated as P2 in FIG. 5B.

It is clear in FIG. 5B that P1 and P2 are different from each other. The start of the measuring time intervals M1, M2 may be triggered by the stabilizing of the signal, or may be triggered after a predetermined time from the first displacement of the mechanical contact member 25 out of its inactive position. The measuring time intervals M1, M2 will generally have a fixed length.

Alternatively, the start of the measuring time intervals M1, M2 may be triggered by an external sensor, which detects the presence of a product carrier and/or carcass part at a certain point along the processing line. The detection may trigger an immediate start of a measuring time interval, or a measuring time interval may start after a predetermined time interval or in a predetermined time window from the detections of the product carrier and/or carcass part.

Figure 6:
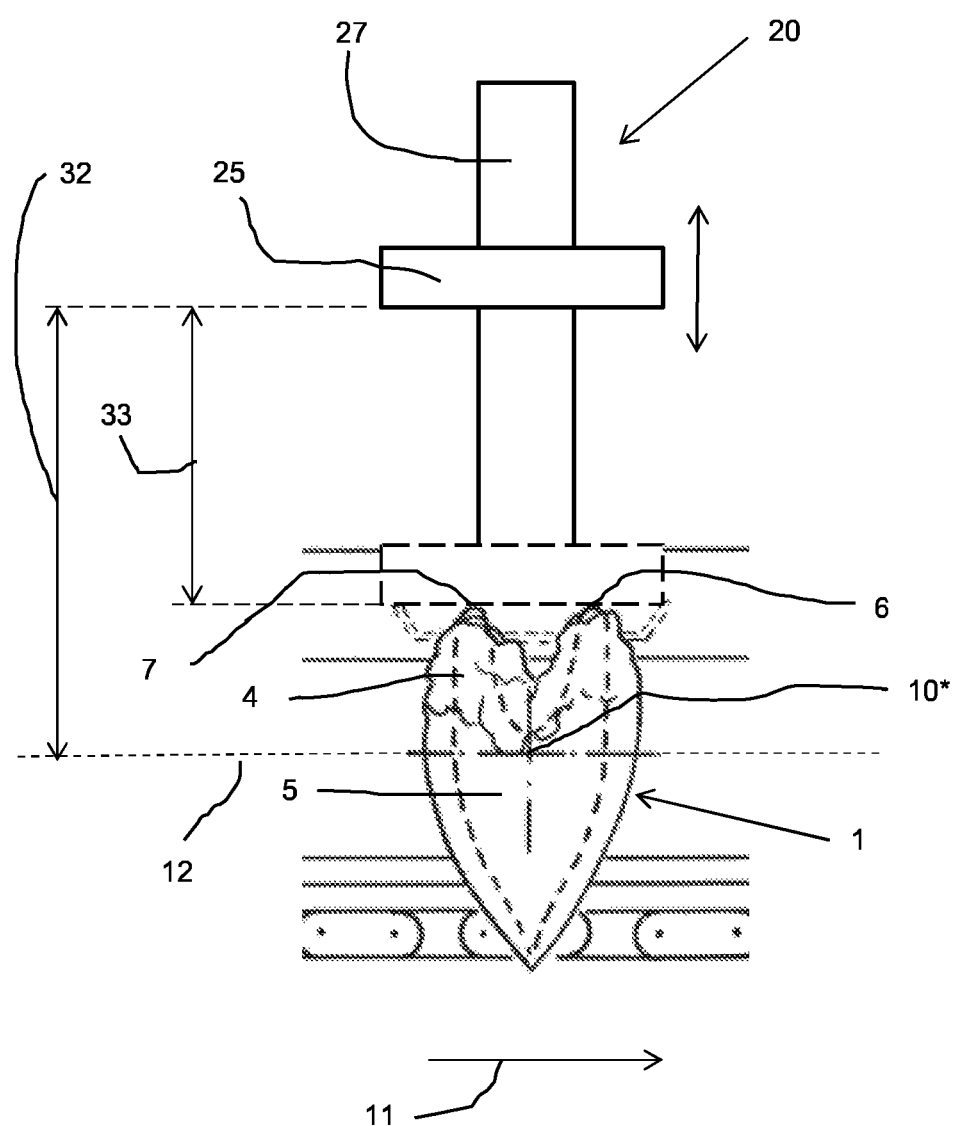

FIG. 6 shows a second exemplary embodiment of the system for measuring a shoulder joint position of a carcass part of slaughtered poultry in accordance with the invention.

In the embodiment according to FIG. 6, the product carrier held in a stationary position along the conveying path 12 during the engaging of the shoulder joint bone structure by the mechanical contact member 25, or at least during the measurement of the shoulder joint position.

In the embodiment of FIG. 6, the transport direction 11 extends in a horizontal plane, and the mechanical contact member is moveable relative to the conveying path 12 of the product carrier in a vertical direction.

Initially, the mechanical contact member 25 is in its inactive position, which is away from the conveying path 12 of the product carrier. This position of the mechanical contact member 25 is shown in a solid line in FIG. 6. The vertical distance 32 from the reference point 10\* of the carrier to the mechanical contact member 25 in its inactive position is known.

When a carcass part 1 arrives at the position measurement device 20 of FIG. 6, either the product carrier stops its movement in the transport direction 11 or the mechanical contact member 25 moves along with the product carrier, e.g. in a carrousel. The mechanical contact member 25 then moves from its known inactive position towards the carcass part 1. In the exemplary embodiment of FIG. 6, the mechanical contact member 25 moves along a guide 27 in vertical direction towards the carcass part 1 until it engages at least one, for example at least the highest one, of the shoulder joint bone structures 6, 7 of the carcass part.

When the mechanical contact member engages the shoulder joint bone structure 6,7, the mechanical contact member 25 is in its measurement position and the measurement of the shoulder joint position takes place. This measurement position of the mechanical contact member 25 is shown in dashed lines in FIG. 6. The measurement of the shoulder joint position is based on the vertical displacement 33 of the mechanical contact member from its inactive position to its measurement position.

Figure 7:
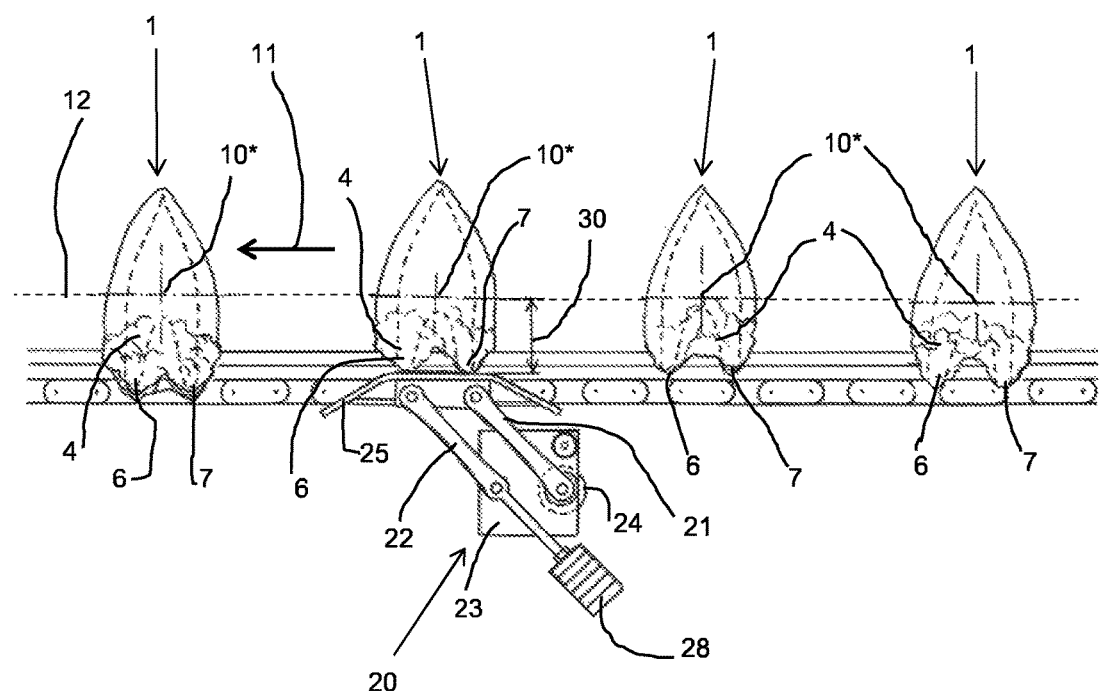

FIG. 7 shows a third exemplary embodiment of the system for measuring a shoulder joint position in accordance with the invention.

In the embodiment of FIG. 7, the carcass parts 1 are arranged on product carriers and are moved along the conveying path 12 in the transport direction 11 with the neck side of the carcass parts facing downward. In this embodiment, the mechanical contact member 25 engages the shoulder joint bone structures 6,7 from below.

Figure 1:
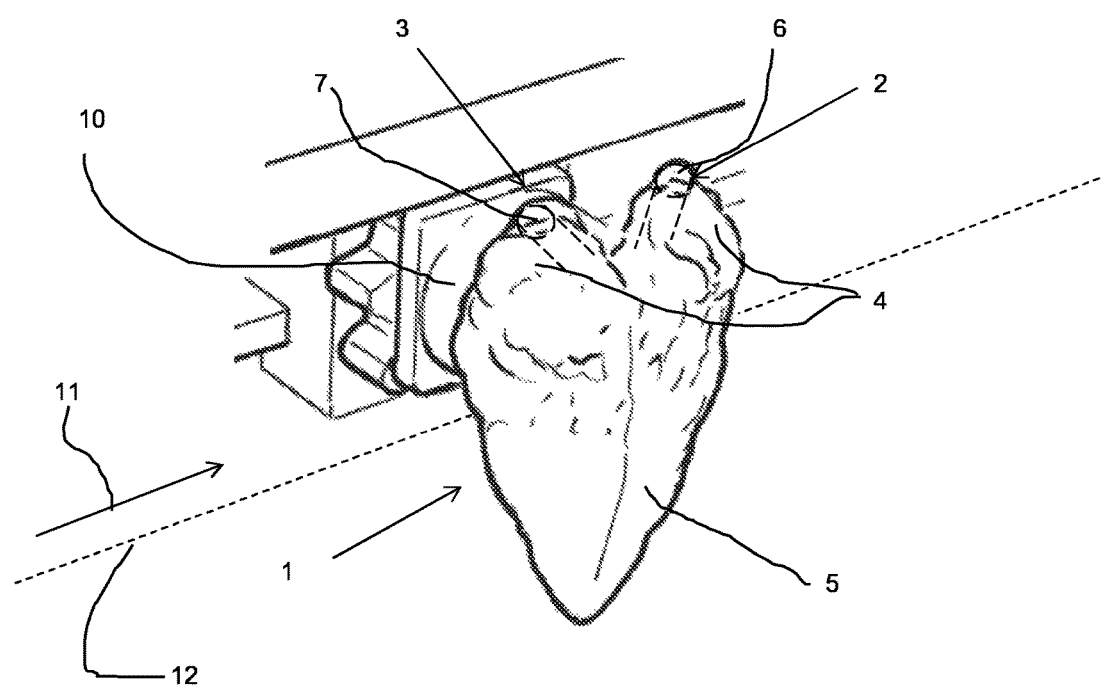
Figure 2:
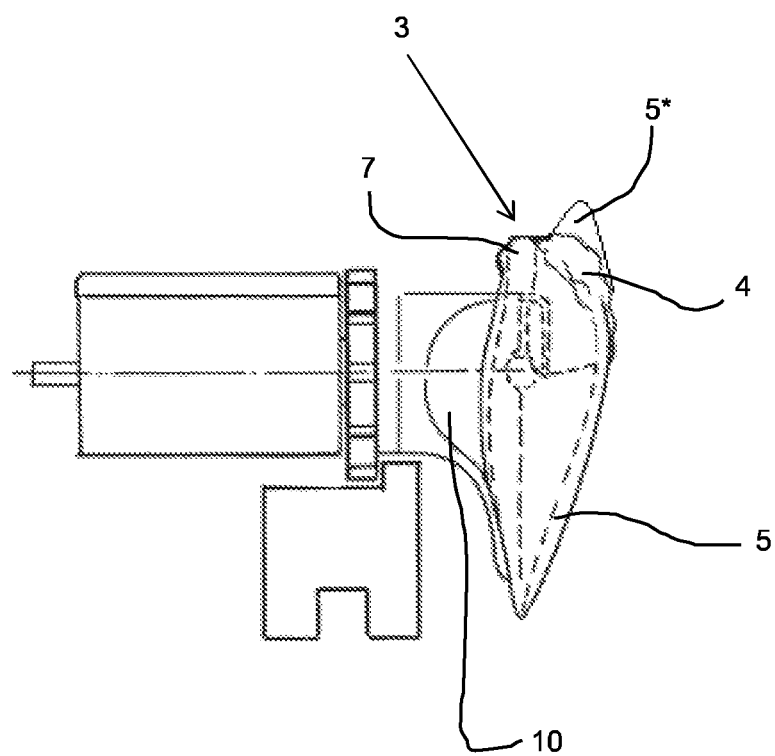
Figure 3:
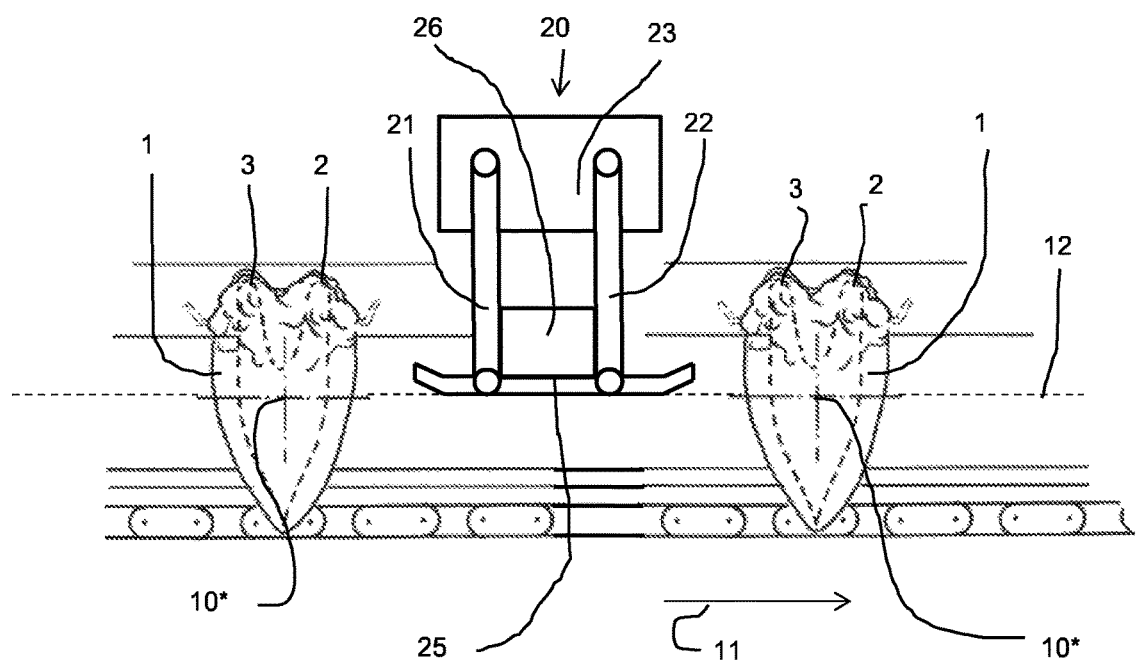

In this embodiment, the position measurement device 20 is arranged below the conveying path 12. The position measurement device 20 is of similar construction as the position measurement devices shown in FIG. 3 and FIG. 4.

FIG. 7 shows the mechanical contact member 25 in its measurement position. In its inactive position, it is arranged closer to the conveying path 12, so above the measurement position that is shown in FIG. 7.

In the embodiment of FIG. 7, the mechanical contact member 25 has a curved or bent shape.

In the embodiment of FIG. 7, the carcass parts 1 are moved by the product carriers in the transport direction 11. When the carcass part 1 shown on the left hand side in FIG. 7 progresses in the transport direction 11, it will come into engagement with the trailing end of the mechanical contact member 25. The trailing edge is the edge that faces in a direction opposite to the transport direction 11 along the conveying path 12. Upon further progression of the product carrier that supports this carcass part 1, the carcass part moves the mechanical contact member 25 out of its inactive position and into its measurement position.

In the embodiment of FIG. 7, the mechanical contact member 25 is arranged at such a position relative to the conveying path 12 that the carcass part 1 displaces the mechanical contact member 25 from the inactive position to the measurement position when the carcass part 1 is moved past the position measurement device 20.

In the embodiment of FIG. 7, the mechanical contact member 25 is in its inactive position arranged at a distance to the conveying path which is smaller than the expected distance between the conveying path and the shoulder joints. When the product carrier moves the carcass part 1 along the conveying path 12, the carcass part 1 runs into the mechanical contact member 25 and comes to engage the mechanical contact member 25. Upon further movement of the product carrier, which carries the carcass part 1, the mechanical contact member 25 slides over the carcass part 1 into engagement with at least one of the shoulder joint bone structures 6,7 and therewith into the measurement position. Once the measurement position has been reached, the measurement of the position of the shoulder joints 2, 3 is carried out. The measurement of the position of the shoulder joints 2, 3 can take place during the entire time period during which the mechanical contact member 25 engages one or both shoulder joint bone structures 6,7 or during a part of that time period.

During the measurement, in this embodiment the mechanical contact member 25 continues to slide over the carcass part 1, and slides over at least one of the shoulder joint bone structures 6, 7, in particular over the shoulder joint bone structure 6, 7 which is furthest away from the reference point 10* of the product carrier. The sliding of the mechanical contact member 25 over at least one of the shoulder joint bone structures 6, 7 ensures that any soft tissue 4 or breast meat 5 that was present on the respective shoulder joint bone structure 6, 7 is pushed away from the shoulder joint bone structure 6, 7. This ensures an accurate measurement of the position of the shoulder joint 2,3.

The distance over which the mechanical contact member 25 is displaced in vertical direction during its displacement from the inactive position to the measurement position provides forms in this embodiment the basis for the measurement of the position of the shoulder joint bone structures 6,7.

In the embodiment shown in FIG. 7 the mechanical contact member 25 in its inactive position is at a known distance from the reference point 10* of the product carrier. When the mechanical contact member 25 has been moved into its measurement position by a passing carcass part 1, the vertical displacement of the mechanical contact member 25 represents the vertical position of at least one of the shoulder joints 2, 3 relative to the reference point 10* of the product carrier. So, the shoulder joint position 30 can be determined on the basis of the measurement of the vertical displacement of the mechanical contact member 25 from its known inactive position to the measurement position. In the embodiment of FIG. 7, this is a downward displacement, while e.g. in the embodiment of FIG. 3 and the variant of FIG. 4, this is and upward displacement.

In the embodiment of FIG. 7, the mechanical contact member 25 remains horizontal during the entire time it engages the carcass part 1. When one shoulder joint 2,3 is at different vertical position than the other one, the mechanical contact member 25 will engage only one shoulder joint at a time. In that case, the shoulder joint bone structures 6,7 will be engaged by the mechanical contact member 25 successively. This allows to determine the difference in position between the left shoulder joint and the right shoulder joint. If there is such a difference, for example the vertical position of the highest shoulder joint may be regarded as the shoulder joint position, or an average of the two may be used.

If the difference in vertical position between the two shoulder joints is too large, this may be used as an indication that the carcass part should not be processed further in an automated processing line.

If there is no difference in vertical position between the left and right shoulder joint bone structures 6,7, the mechanical contact member 25 will engage both shoulder joint bone structures 6,7 simultaneously.

In the embodiment of FIG. 7, an additional weight 28 has been provided onto one of the connector arms 21. This additional weight 28 biases the mechanical contact member 25 towards its inactive position, which ensures good contact between the shoulder joint bone structures 6,7 and the mechanical contact member 25, and therewith contributes to an accurate measurement of the shoulder joint position.

Figure 8:
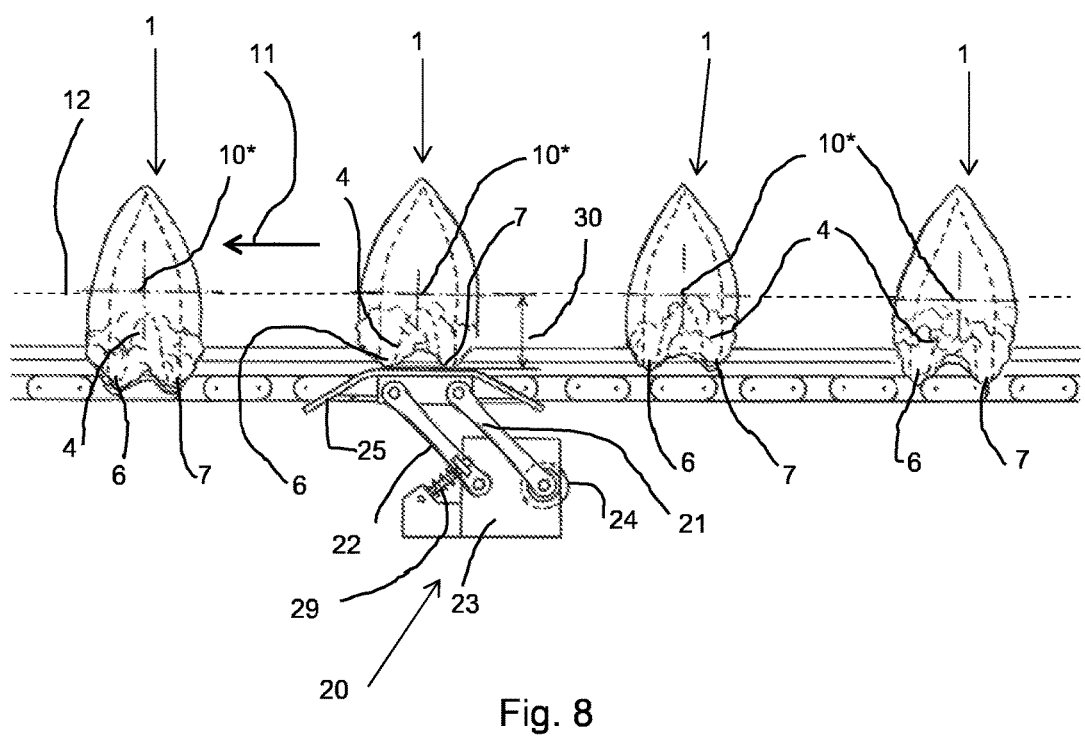

FIG. 8 shows a variant of the embodiment of FIG. 7, with the mechanical contact member 25 shown in the measurement position.

In the variant of FIG. 8, instead of the additional weight 28, a spring 29 has been provided to bias the mechanical contact member 25 towards its inactive position, which ensures good contact between the shoulder joint bone structures 6,7 and the mechanical contact member 25, and therewith contributes to an accurate measurement of the shoulder joint position.

Figure 9A:
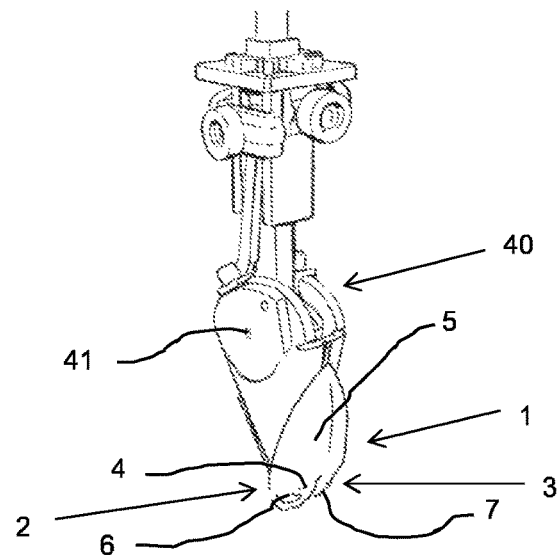
Figure 9B:
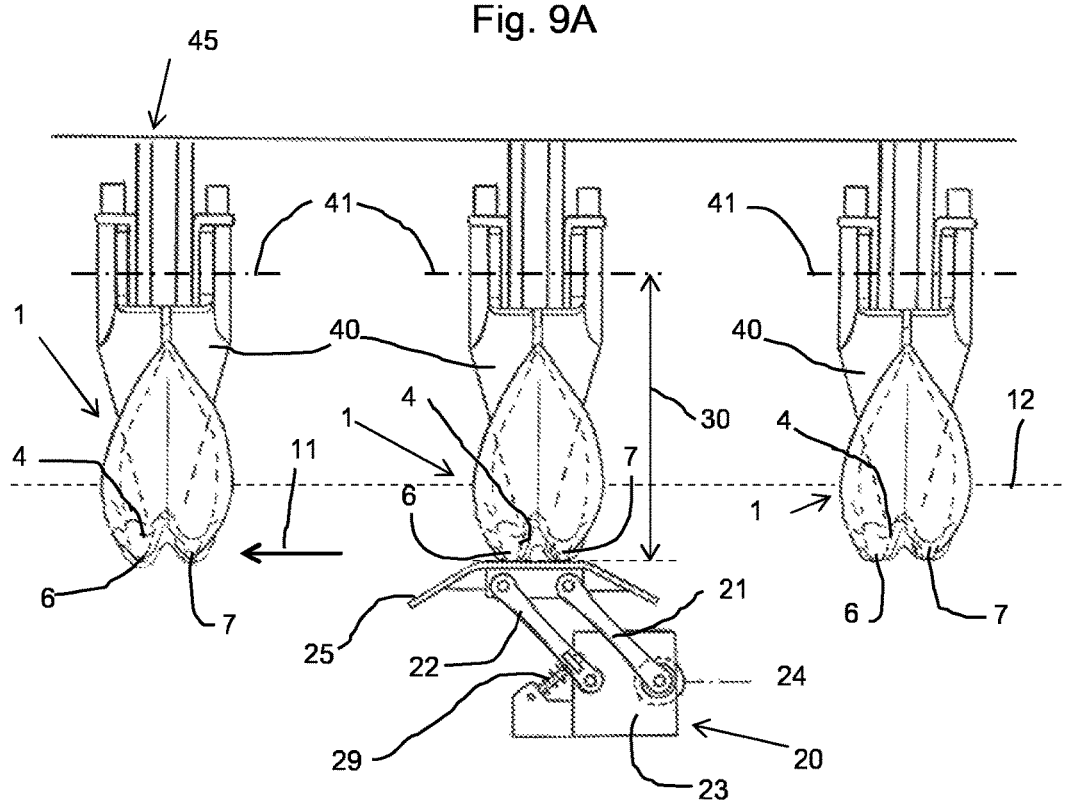

FIG. 9A shows carcass part 1, in particular a breast cap, on an alternative carrier 40. FIG. 9B shows the variant of FIG. 8 in combination with a plurality of these carriers 40.

The carrier 40 is pivotable about a carrier rotation axis 41, which for example extends in horizontal direction. Optionally, the carrier 40 is in addition rotatable about a vertical carrier rotation axis.

In this example, the carrier rotation axis 41 may be used as a reference point or reference line of the carrier 40.

The breast cap comprises a left shoulder joint 2, a right shoulder joint 3, soft tissue 4 adjacent the shoulder joints and at least a part of the breast meat 5 adjacent the shoulder joints. The left shoulder joint 2 and the right shoulder joint 3 each contain a shoulder joint bone structure 6,7.

FIG. 9B shows the variant of FIG. 8 in combination with a plurality of these carriers 40. In the embodiment of FIG. 9B, the plurality of carriers 40 form part of a conveyor system 45, which is in this example an overhead conveyor system.

In the embodiment of FIG. 9B, the carcass parts 1 are moved by the product carriers 40 in the transport direction 11. When the carcass part 1 shown on the left hand side in FIG. 9B progresses in the transport direction 11, it will come into engagement with the trailing end of the mechanical contact member 25. The trailing edge is the edge that faces in a direction opposite to the transport direction 11 along the conveying path 12. Upon further progression of the product carrier 40 that supports this carcass part 1, the carcass part moves the mechanical contact member 25 out of its inactive position and into its measurement position.

In the embodiment of FIG. 9B, the mechanical contact member 25 is arranged at such a position relative to the conveying path 12 that the carcass part 1 displaces the mechanical contact member 25 from the inactive position to the measurement position when the carcass part 1 is moved past the position measurement device 20.

In the embodiment of FIG. 9B, the mechanical contact member 25 is in its inactive position arranged at a distance to the conveying path which is smaller than the expected distance between the conveying path and the shoulder joints. When the product carrier moves the carcass part 1 along the conveying path 12, the carcass part 1 runs into the mechanical contact member 25 and comes to engage the mechanical contact member 25. Upon further movement of the product carrier, which carries the carcass part 1, the mechanical contact member 25 slides over the carcass part 1 into engagement with at least one of the shoulder joint bone structures 6,7 and therewith into the measurement position. Once the measurement position has been reached, the measurement of the position of the shoulder joints 2, 3 is carried out. The measurement of the position of the shoulder joints 2, 3 can take place during the entire time period during which the mechanical contact member 25 engages one or both shoulder joint bone structures 6,7 or during a part of that time period.

During the measurement, in this embodiment the mechanical contact member 25 continues to slide over the carcass part 1, and slides over at least one of the shoulder joint bone structures 6, 7, in particular over the shoulder joint bone structure 6, 7 which is furthest away from the carrier rotation axis 41 of the product carrier, which carrier rotation axis 41 serves as a reference line. The sliding of the mechanical contact member 25 over at least one of the shoulder joint bone structures 6, 7 ensures that any soft tissue 4 or breast meat 5 that was present on the respective shoulder joint bone structure 6, 7 is pushed away from the shoulder joint bone structure 6, 7. This ensures an accurate measurement of the position of the shoulder joint 2,3.

The distance over which the mechanical contact member 25 is displaced in vertical direction during its displacement from the inactive position to the measurement position provides forms in this embodiment the basis for the measurement of the position of the shoulder joint bone structures 6,7.

In the embodiment shown in FIG. 9B the mechanical contact member 25 in its inactive position is at a known distance from the carrier rotation axis 41 of the product carrier. When the mechanical contact member 25 has been moved into its measurement position by a passing carcass part 1, the vertical displacement of the mechanical contact member 25 represents the vertical position of at least one of the shoulder joints 2, 3 relative to the carrier rotation axis 41 of the product carrier. So, the shoulder joint position 30 can be determined on the basis of the measurement of the vertical displacement of the mechanical contact member 25 from its known inactive position to the measurement position. In the embodiment of FIG. 9B, this is a downward displacement, while e.g. in the embodiment of FIG. 3 and the variant of FIG. 4, this is and upward displacement.

Figure 10:
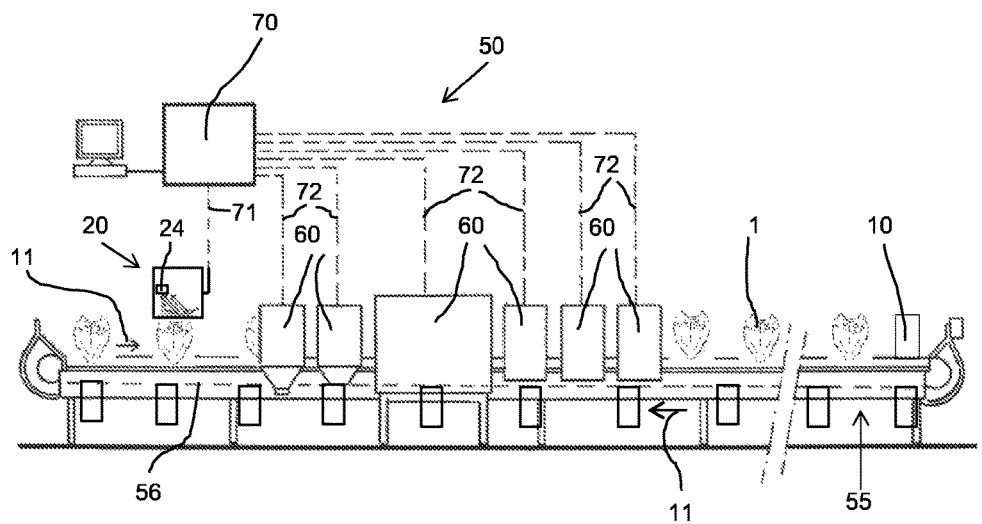

FIG. 10 shows a first embodiment of poultry processing system 50 according to the invention.

In the example of FIG. 10, the poultry processing system 50 comprises a system for measuring a shoulder joint position of a carcass part of slaughtered poultry according to the invention. The system comprises for measuring a shoulder joint position comprises a position measurement device 20, e.g. in accordance with an embodiment described above, and multiple product carriers 10.

The multiple product carriers 10 from part of a conveyor system 55, which further comprises a track 56 and drive means. The product carriers 10 are moveable along the track in transport direction 11. The product carriers 10 are adapted to support a carcass part 1 and to move it along at least a part of the track 56, for example along a part of a top flight of the track 56.

In the example of FIG. 10, the poultry processing system further comprises multiple processing stations 60. Each processing station 60 which is adapted to carry out a processing operation on the carcass part 1. The processing stations 60 are arranged along the conveying path of the product carriers 10, which is prescribed by the track 56, downstream of the position measurement device 20.

In the embodiment of FIG. 10, the position measurement device 20 comprises a detector 24 which is adapted to generate a measurement signal. The detector is in communication with the mechanical contact member of the position measurement device 20, for example by a mechanical connection and/or an electrical connection and/or a data connection.

In the embodiment of FIG. 10, the poultry processing system further comprises a processing controller 70. The processing controller 70 is connected to the position measurement device 20 by a first data connection 71. The first data connection 71 is adapted to transfer the measurement signal from the position measurement device to the processing controller. The first data connection 71 for example comprises a first data transfer wire or a wireless data connection.

In this embodiment, the processing controller 70 is adapted to generate a plurality of control signals based on the measurement signal. Each processing station receives an associated control signal via a dedicated second data connection 72 which is adapted to transfer the control signal from the processing controller 70 to the individual processing station 60. The second data connection for example comprises a first data transfer wire or a wireless data connection. The processing operation on the carcass part in the processing station 60 is then controlled by the control signal or by a combination of signals comprising the control signal.

Figure 11:
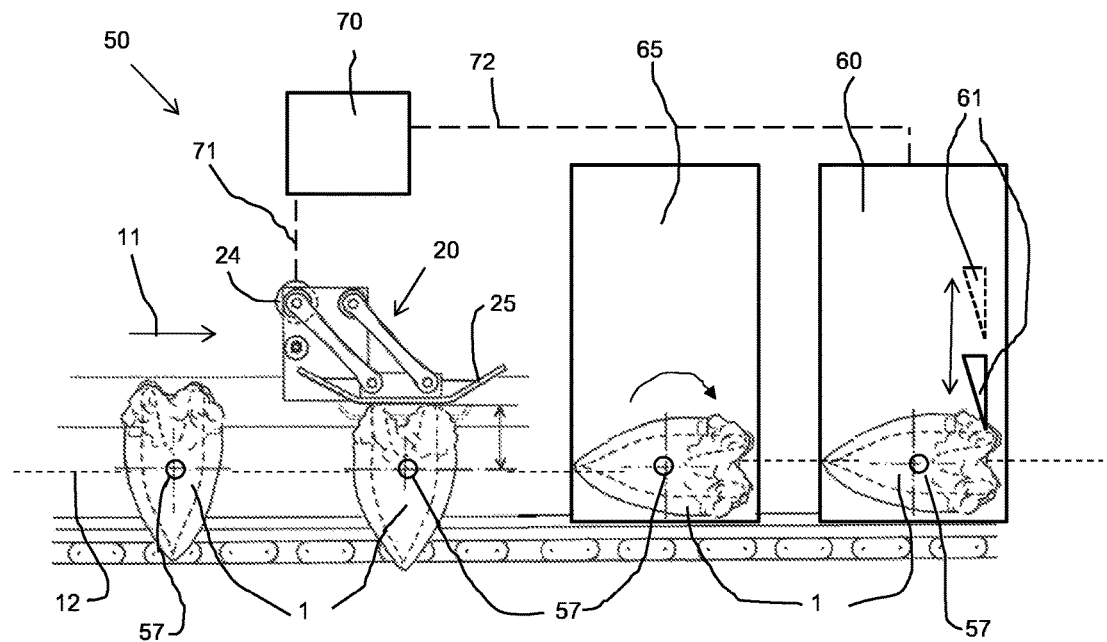

FIG. 11 shows a second embodiment of poultry processing system 50 according to the invention.

In the example of FIG. 11, the poultry processing system 50 comprises a system for measuring a shoulder joint position of a carcass part of slaughtered poultry according to the invention. The system comprises for measuring a shoulder joint position comprises a position measurement device 20, e.g. in accordance with an embodiment described above, and multiple product carriers that each support a carcass part 1. The product carriers move the carcass parts 1 in the transport direction 11.

In the embodiment of FIG. 11, the position measurement device 20 comprises a detector 24 which is adapted to generate a measurement signal. The detector is in communication with the mechanical contact member of the position measurement device 20, for example by a mechanical connection and/or an electrical connection and/or a data connection.

In the embodiment of FIG. 11, the poultry processing system further comprises a processing controller 70. The processing controller 70 is connected to the position measurement device 20 by a first data connection 71. The first data connection 71 is adapted to transfer the measurement signal from the position measurement device to the processing controller. The first data connection 71 for example comprises a first data transfer wire or a wireless data connection.

In this embodiment, the processing controller 70 is adapted to generate a control signal based on the measurement signal. The processing station 60 receives a control signal via a second data connection 72 which is adapted to transfer the control signal from the processing controller 70 to the individual processing station 60. The second data connection for example comprises a first data transfer wire or a wireless data connection.

In the embodiment of FIG. 11, the product carrier is pivotable about a carrier rotation axis 57 into a position in which the carcass part is supported with the shoulder joints directed in the downstream direction of the conveying path 12. In this embodiment, the poultry processing system comprises a turning station 65 which is adapted to pivot the product carrier from a position in which the left shoulder joint and right shoulder joint of the carcass part are arranged one behind the other as seen in the transport direction into the position in which the carcass part is supported with the shoulder joints directed in the downstream direction of the conveying path. The turning station 65 is arranged between the position measurement device 20 of the system for measuring a shoulder joint position and the processing station 60.

In the embodiment of FIG. 11, the processing station 60 comprises a processing tool 61 which is moveable between an inactive position (indicated by dashed lines in FIG. 11) and an operational position (indicated by a solid line in FIG. 11). In this embodiment, the processing controller 70 is adapted to control the movement of the processing tool 61 between the inactive position and the operational position by the generated control signal.

In the embodiment of FIG. 11, the control signal triggers the movement of the processing tool from the inactive position into the operational position, which makes the control signal a tool activation signal. The timing of the tool activation signal is based on the position measurement.

The invention claimed is:

1. A system for measuring a shoulder joint position of a carcass part of slaughtered poultry, wherein the carcass part comprises a left shoulder joint, a right shoulder joint, soft tissue adjacent the left and/or right shoulder joints and at least a part of the breast meat adjacent the left and/or right shoulder joints, wherein the left shoulder joint and the right shoulder joint each contain a shoulder joint bone structure, the system comprising:
a position measurement device, the position measurement device comprising a mechanical contact member adapted to engage at least one of the left and right shoulder joints during a measurement of the shoulder joint position; and
a product carrier moveable in a transport direction along a conveying path, the conveying path extending along the position measurement device, the product carrier being adapted to support the carcass part during the movement of the product carrier along the conveying path past the position measurement device during the measurement of the shoulder joint position,
wherein the position of the product carrier during the measurement of the shoulder joint position is such that the carcass part is arranged relative to the position measurement device with the left shoulder joint and right shoulder joint one behind the other as seen in the transport direction so as to allow the mechanical contact member to engage a shoulder joint bone structure of at least one of the left and right shoulder joint.

2. The system according to claim 1, wherein the mechanical contact member has a curved or bent shape adapted to move soft tissue and/or breast meat away from the shoulder joint bone structure.

3. The system according to claim 1, wherein the mechanical contact member is moveable relative to the conveying path of the product carrier between a predetermined inactive position in which the mechanical contact member is not in engagement with a shoulder joint bone structure and a measurement position in which the mechanical contact member is in engagement with a shoulder joint bone structure such that a measurement can be carried out, and
wherein the measurement of the shoulder joint position is based on the distance between the inactive position and the measurement position.

4. The system according to claim 3, wherein the mechanical contact member is arranged at such a position relative to the conveying path that the carcass part displaces the mechanical contact member from the inactive position to the measurement position when the carcass part is moved past the position measurement device.

5. The system according to claim 4, wherein the mechanical contact member is connected to a base by two mutually parallel connector arms, the connector arms being pivotable relative to the base, as well as pivotable relative to the mechanical contact member.

6. The system according to claim 5, wherein the position measurement device comprises a detector adapted to determine the pivot angle over which at least one connector arm is pivoted due to the displacement of the mechanical contact member by the carcass part.

7. The system according to claim 3, wherein the system further comprises a reference, and wherein the inactive position of the mechanical contact member is arranged at a known distance from the reference.

8. The system according to claim 3, wherein the position measurement device further comprises a detector adapted to determine the distance between the inactive position and the measurement position and to generate a measurement signal based on this determined distance between the inactive position and the measurement position of the mechanical contact member.

9. A poultry processing system, comprising:
the system for measuring a shoulder joint position of a carcass part of slaughtered poultry according to claim 8;
a processing station adapted to carry out a processing operation on the carcass part, the processing station being arranged along the conveying path of the product carrier, downstream of the position measurement device of the system for measuring a shoulder joint position; and a processing controller connected to the position measurement device by a first data connection adapted to transfer the measurement signal from the position measurement device to the processing controller, wherein the processing controller is adapted to generate a control signal based on the measurement signal, and wherein the processing controller is connected to the processing station by a second data connection adapted to transfer the control signal from the processing controller to the processing station.

10. The poultry processing system according to claim 9, wherein the processing station comprises a processing tool moveable between an inactive position and an operational position, and wherein the processing controller is adapted to control the movement of the processing tool between the inactive position and the operational position by the generated control signal.

11. The system according to claim 2, wherein the mechanical contact member is moveable relative to the conveying path of the product carrier between a predetermined inactive position in which the mechanical contact member is not in engagement with a shoulder joint bone structure and a measurement position in which the mechanical contact member is in engagement with a shoulder joint bone structure such that a measurement can be carried out, and wherein the measurement of the shoulder joint position is based on the distance between the inactive position and the measurement position.

12. The system according to claim 2, wherein the position measurement device further comprises a biasing element adapted to provide a biasing force to the mechanical contact member, the biasing force being directed towards the conveying path.

13. The system according to claim 1, wherein the position measurement device further comprises a biasing element adapted to provide a biasing force to the mechanical contact member, the biasing force being directed towards the conveying path.

14. A method for measuring a shoulder joint position of a carcass part of slaughtered poultry, wherein the carcass part comprises a left shoulder joint, a right shoulder joint, soft tissue adjacent the left and/or right shoulder joints and at least a part of the breast meat adjacent the left and/or right shoulder joints, wherein the left shoulder joint and the right shoulder joint each contain a shoulder joint bone structure, the method comprising the following steps:

arranging the carcass part on a product carrier which is moveable in a transport direction along a conveying path, the product carrier being adapted to support the carcass part during movement along the conveying path; and moving the product carrier with the carcass part supported thereon in a position relative to a position measurement device, the position measurement device comprising a mechanical contact member, and bringing the mechanical contact member into engagement with at least one of the left and right shoulder joint, and during this engagement, measuring the shoulder joint position, wherein the product carrier during the measurement of the shoulder joint position is arranged such that the carcass part is arranged relative to the position measurement device with the left shoulder joint and right shoulder joint one behind the other as seen in the transport direction so as to allow the mechanical contact member to engage a shoulder joint bone structure of at least one of the left and right shoulder joint.

15. The method according to claim 14, wherein the carcass part is moved along the conveying path in the transport direction during the measurement of the shoulder joint position.

16. The method according to claim 15, wherein the mechanical contact member moves soft tissue and/or breast meat away from the shoulder joint bone structure upon the carcass part passing the position measurement device.

17. The method according to claim 14, wherein the mechanical contact member is moved relative to the conveying path of the product carrier between a predetermined inactive position in which the mechanical contact member is not in engagement with a shoulder joint bone structure and a measurement position in which the mechanical contact member is in engagement with a shoulder joint bone structure, and wherein the measurement of the shoulder joint position is based on the distance between the inactive position and the measurement position.

18. The method according to claim 17, wherein the carcass part displaces the mechanical contact member from the inactive position to the measurement position upon the movement of the carcass part past the position measurement device.

19. The method according to claim 17, wherein the method further comprises the steps of:

generating a measurement signal based on the determined distance between the inactive position and the measurement position of the mechanical contact member;

transferring the measurement signal to a processing controller;

in the processing controller, transforming the measurement signal into a control signal;

transferring the control signal to a processing station; and carrying out a processing operation on the carcass part in the processing station, the processing operation being controlled by the control signal.

20. The method according to claim 14, the method further comprising the following steps:

downstream of the position measurement device, pivoting the product carrier about a horizontal carrier rotation axis into a position in which the shoulder joints are directed in the downstream direction of the conveying path as seen in the transport direction of the product carrier;

moving the product carrier to a processing station comprising a processing tool moveable between an inactive position and an operational position; and triggering movement of the processing tool from the inactive position into the operational position by a tool activation signal, wherein timing of the tool activation signal is based on the shoulder joint position measurement.

* * * * *